US011151810B2

(12) United States Patent
Ryan et al.

(10) Patent No.: US 11,151,810 B2
(45) Date of Patent: Oct. 19, 2021

(54) ADAPTABLE VEHICLE MONITORING SYSTEM

(71) Applicant: Aurora Flight Sciences Corporation, Manassas, VA (US)

(72) Inventors: Jason Christopher Ryan, Malden, MA (US); Jessica Edmonds Duda, Wayland, MA (US); Andrew Musto, Cambridge, MA (US)

(73) Assignee: Aurora Flight Sciences Corporation, Manassas, VA (US)

( * ) Notice: Subject to any disclaimer, the term of this patent is extended or adjusted under 35 U.S.C. 154(b) by 606 days.

(21) Appl. No.: 16/159,463

(22) Filed: Oct. 12, 2018

(65) Prior Publication Data

US 2020/0118366 A1 Apr. 16, 2020

(51) Int. Cl.
*G07C 5/08* (2006.01)
*G06N 20/00* (2019.01)
(Continued)

(52) U.S. Cl.
CPC ......... *G07C 5/0816* (2013.01); *G07C 5/0866* (2013.01); *B60K 35/00* (2013.01);
(Continued)

(58) Field of Classification Search
None
See application file for complete search history.

(56) References Cited

U.S. PATENT DOCUMENTS 4,063,073 A 12/1977 Strayer
5,157,615 A 10/1992 Brodegard et al.
(Continued)

FOREIGN PATENT DOCUMENTS

EP 2251851 11/2010
EP 2270618 A1 1/2011
WO WO 2016/035002 3/2016

OTHER PUBLICATIONS

Aurora Flight Sciences; Centaur Optionally-Piloted Aircraft brochure.
(Continued)

*Primary Examiner* — Kelly D Williams
(74) *Attorney, Agent, or Firm* — Michael Stanley Tomsa; McAndrews, Held & Malloy, Ltd.; Eugene H. Nahm

(57) ABSTRACT

An adaptable vehicle monitoring system is disclosed. The system includes a core platform having a state monitoring subsystem and a feedback subsystem. The core platform interconnects a perception subsystem, a knowledge acquisition subsystem, and a user interface. The perception subsystem is configured to acquire current vehicle state data from instruments of a vehicle. The knowledge acquisition subsystem includes a context awareness subsystem configured to determine a current vehicle context. The state monitoring subsystem is configured to derive a current vehicle state based at least in part on the vehicle state data and vehicle context. The knowledge acquisition subsystem further includes a database subsystem configured to store the current vehicle state data, current vehicle context, and current vehicle state. The trend monitoring subsystem is configured to analyze the one or more stored vehicle state data, stored vehicle contexts, and stored vehicle states to identify one or more trends. The feedback subsystem is configured to prepare operator and deliver operator feedback via the user interface based at least in part on a comparison between the current vehicle state and/or current trend and an expected vehicle state and/or previously identified trends.

18 Claims, 12 Drawing Sheets

(51) Int. Cl.
*B60K 35/00* (2006.01)
*B60Q 9/00* (2006.01)
*B64D 45/00* (2006.01)

(52) U.S. Cl.
CPC ............... *B60Q 9/00* (2013.01); *B64D 45/00* (2013.01); *B64D 2045/0085* (2013.01); *G06N 20/00* (2019.01)

(56) References Cited

U.S. PATENT DOCUMENTS

| | | |
|---|---|---|
| 5,283,643 A | 2/1994 | Fujimoto |
| 6,480,152 B2 | 11/2002 | Lin et al. |
| 6,604,044 B1 | 8/2003 | Kirk |
| 6,820,006 B2 | 11/2004 | Patera |
| 6,993,420 B2 | 1/2006 | Le Draoullec et al. |
| 7,106,219 B2 | 9/2006 | Pearce |
| 7,176,830 B2 | 2/2007 | Horibe |
| 7,193,729 B1 | 3/2007 | Li |
| 7,203,630 B2 | 4/2007 | Kolb et al. |
| 7,437,220 B2 | 10/2008 | Stefani |
| 7,624,943 B2 | 12/2009 | Cerchie et al. |
| 7,650,232 B1 | 1/2010 | Paielli |
| 7,784,741 B2 | 8/2010 | Cerchie et al. |
| 7,848,698 B2 | 12/2010 | Batcheller et al. |
| 7,954,965 B1 | 6/2011 | Boyd et al. |
| 8,026,827 B1 | 9/2011 | Boyd et al. |
| 8,049,658 B1 | 11/2011 | Lagonik et al. |
| 8,052,096 B2 | 11/2011 | Cerchie et al. |
| 8,290,638 B2 | 10/2012 | Eicke et al. |
| 8,306,672 B2 | 11/2012 | Nickolaou |
| 8,319,665 B2 | 11/2012 | Weinmann et al. |
| 8,319,666 B2 | 11/2012 | Weinmann et al. |
| 8,346,480 B2 | 1/2013 | Trepagnier et al. |
| 8,373,751 B2 | 2/2013 | Han et al. |
| 8,411,145 B2 | 4/2013 | Fardi |
| 8,466,827 B2 | 6/2013 | Nanami |
| 8,616,883 B2 | 12/2013 | Wokurka |
| 8,616,884 B1 | 12/2013 | Lechner et al. |
| 8,768,534 B2 | 7/2014 | Lentz |
| 9,052,393 B2 | 6/2015 | Kriel et al. |
| 9,097,801 B2 | 8/2015 | Kambe et al. |
| 9,507,021 B2 | 11/2016 | Lynam |
| 2002/0004695 A1 | 1/2002 | Glenn et al. |
| 2007/0236366 A1 | 10/2007 | Gur et al. |
| 2008/0243328 A1 | 10/2008 | Yu et al. |
| 2008/0316010 A1 | 12/2008 | Chang |
| 2009/0198392 A1 | 8/2009 | Eicke et al. |
| 2011/0149067 A1 | 6/2011 | Lewis et al. |
| 2011/0171611 A1 | 7/2011 | Batcheller et al. |
| 2014/0080099 A1 | 3/2014 | Sowadski et al. |
| 2015/0094982 A1 | 4/2015 | Dupont De Dinechin |
| 2015/0323932 A1 | 11/2015 | Paduano et al. |
| 2016/0019793 A1 | 1/2016 | Fournier et al. |
| 2019/0033861 A1* | 1/2019 | Groden ................ B64D 17/80 |
| 2020/0090524 A1* | 3/2020 | Cherepinsky .......... G05D 1/101 |

OTHER PUBLICATIONS

Day, Carole; Your (robot) captain speaking; The Australian Financial Review; Aug. 20, 2016.

Jeong, Heejin, et al.; A Robot-Machine Interface for Full-functionality Automation using a Humanoid; 2014 IEEE/RSJ International Conference on Intelligent Robots and Systems (IROS 2014); Sep. 14-18, 2014, Chicago, IL.

Markoff, John; A Machine in the Co-Pilot's Seat; The New York Times; Jul. 20, 2015.

Bone, Randall S., et al., Pilot and Air Traffic Controller use of Interval Management during Terminal Metering Operations, MTR170570, Mitre Technical Report, Jan. 2018.

Mitre Webpage: Digital Copilot—Aviation and Transportation—https://www.mitre.org/research/mission-focused-research/aviation-and-transportation (accessed Oct. 12, 2018).

International Search Report and Written Opinion, dated Jun. 21, 2017, in International application No. PCT/US2017/023523, filed Mar. 22, 2017.

Partial European search report, dated Feb. 21, 2020, in European application No. 19202595.5.

Extended European search report, dated Jun. 26, 2020, in European application No. 19202595.5 (12 pages) European Patent Office, Germany.

* cited by examiner

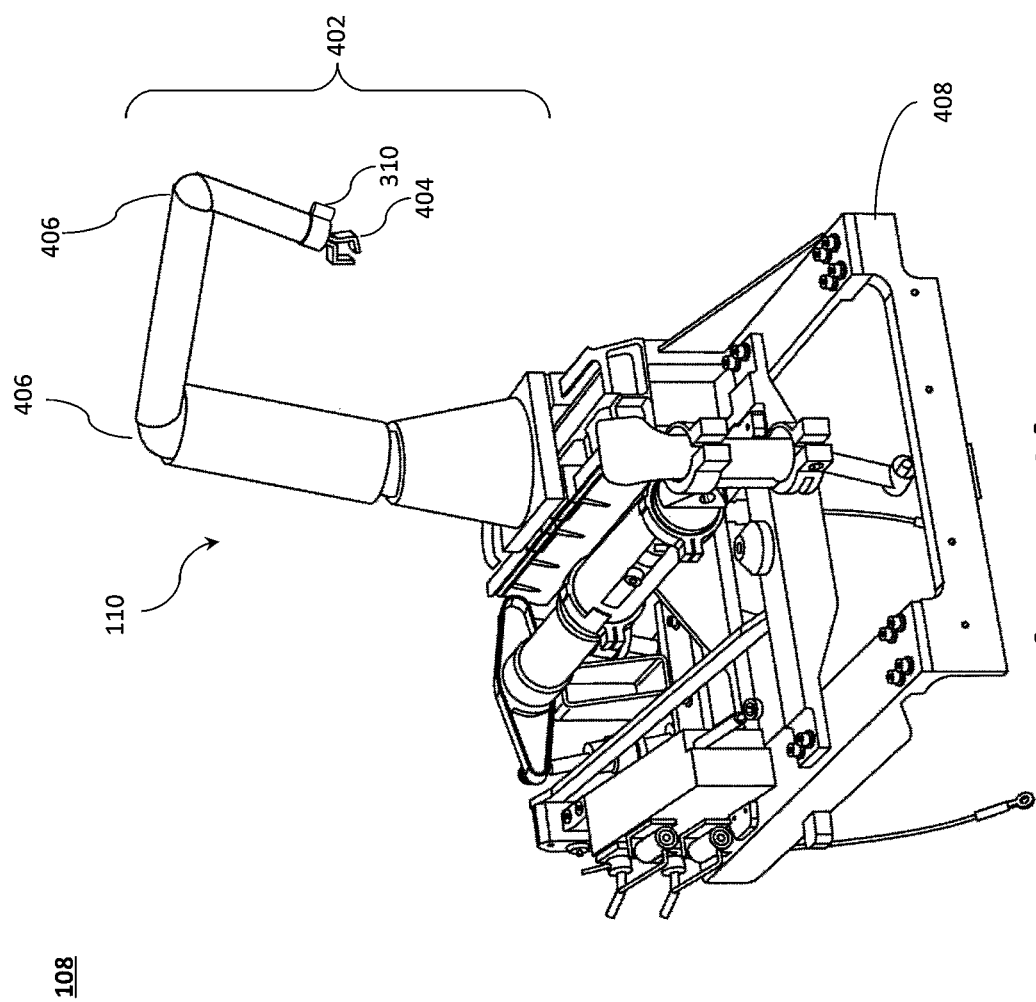

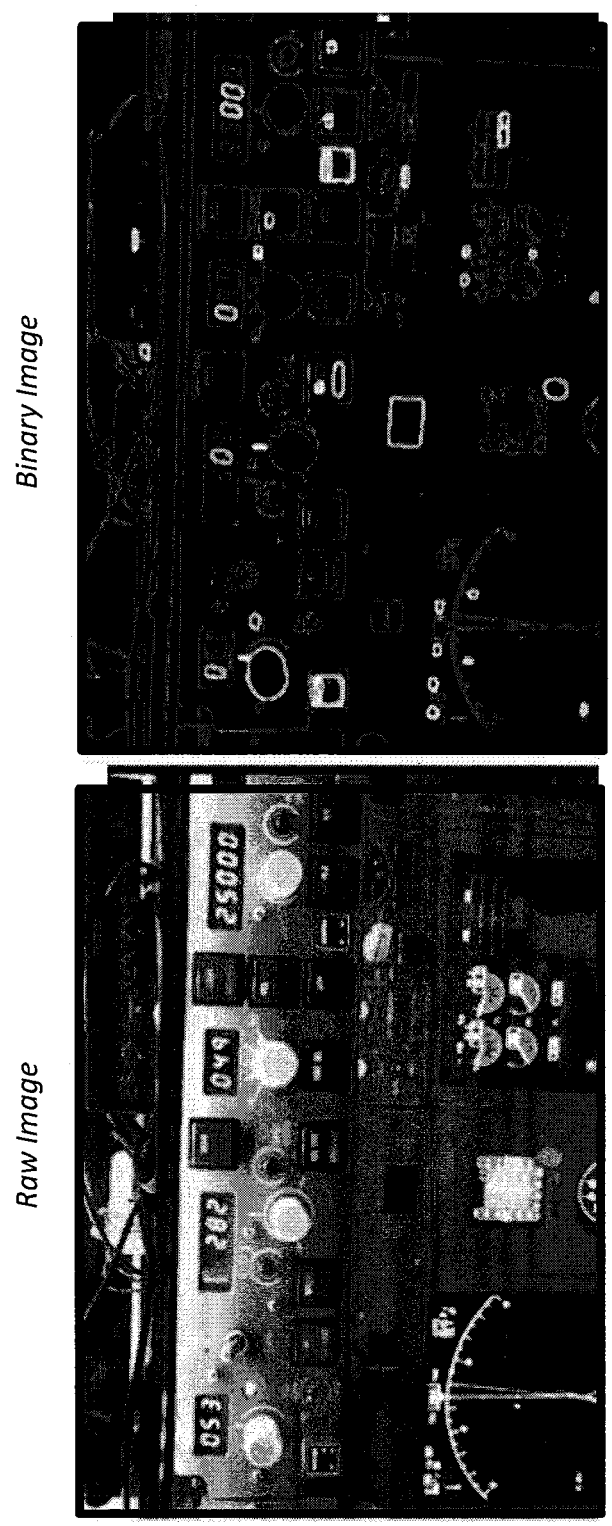

**Typical Procedure in
Pilots Operating Handbook**

| ENGINE START | |
|---|---|
| A. Chocks | Removed (L&R) |
| B. ALT/BAT switches | ON (OFF-Ext Pwr) |
| C. External Power....... | Connect if req |
| D. NAV LT switch......... | ON |
| E. BEACON LT switch | ON |
| F. Chip Detector light | Press to test |
| G. Wobble Pump | Pump to 5 psi |
| H. Fuel Press Warning Light | Out |
| I. Prime | 4-5 strokes (cold) |
| J. Prime | 1-2 strokes (warm) |
| K. Propeller | Clear |
| L. Plane Captain | Signal Start |
| M. Starter | Engage |
| N. | *After 7 Blades:* |
| O. Boost Coil | On |
| P. Magnetos switch | BOTH |
| Q. Starter | OFF (Eng running) |
| R. Boost Coil | OFF (Eng run. smooth) |
| S. Brakes.................. | Hold |
| T. Oil Pressure | Ck Rise w/in 30s |
| U. Throttle | Set 1000 RPM |
| V. External Power | Disconnect if used |
| W. ALT/BAT switches | Check on |
| X. Eng Instruments | Check |
| Y. Carb Heat | As req |
| Z. Primer | Down and Locked |

An operation can be completed once any of its prerequisite sets is complete. Prerequisite sets are comprised of parent operations (incoming edges)

Figure 7a

ADAPTABLE VEHICLE MONITORING SYSTEM

STATEMENT OF GOVERNMENT INTEREST

This invention was made with government support under Contract Number: N65236-16-C-8008 awarded by the Defense Advanced Research Projects Agency (DARPA). The government has certain rights in the invention.

TECHNICAL FIELD

The present disclosure relates to a vehicle monitoring system, and, more particularly, to a vehicle monitoring system that is adaptable to different types of vehicles.

BACKGROUND

Vehicle monitoring may be performed as a data-recording function (for off-line analysis, quality assurance, or record-keeping), and/or as a health and usage monitoring system (HUMS) function specialized to a certain subsystem on board the vehicle (engines, for instance). Real-time monitoring may not take into account vehicle operations (e.g., phase of operation, checklist execution, etc.) and/or other functions that may require operator awareness or action.

Vehicle monitoring systems may lack context or awareness of the overall vehicle "state." For example, the location, step within the checklist, the checklist execution state, and/or what the configuration of the vehicle is in terms of where it is, the switch and control status, and/or the location with respect to geographical features in the mission (e.g., airports, seaports, gas stations, waypoints) and/or other vehicles. Lack of 'state awareness' by the onboard monitoring systems, where applicable, may result in the operator not being alerted to errors, and in dangerous, unsafe, and/or undesirable trends being ignored, unless they are identified by the operator.

SUMMARY

The present disclosure relates to a vehicle monitoring system, and, more particularly, to a vehicle monitoring system that is adaptable to different types of vehicles.

According to a first aspect, an adaptable vehicle monitoring system for providing operator feedback to an operator during operation of a vehicle comprises: a context awareness subsystem configured to determine a current vehicle context, wherein the current vehicle context reflects an operational mode of the vehicle; a state monitoring subsystem configured to derive a current vehicle state based at least in part on current vehicle state data, wherein the state monitoring subsystem is operatively coupled with a knowledge acquisition subsystem that is configured to correlate the vehicle state data with the current vehicle context as a function of at least one parameter of the vehicle, and wherein the state monitoring subsystem is configured to analyze the current vehicle state data and the current vehicle context to identify one or more trends; a feedback subsystem operatively coupled with the state monitoring subsystem, wherein the feedback subsystem is configured to prepare operator feedback based at least in part on a comparison between the current vehicle state and an expected vehicle state, and wherein the expected vehicle state is derived based at least in part on one or more stored vehicle states and the one or more trends; and a user interface configured to provide the prepared operator feedback to the operator.

In certain aspects, the state monitoring subsystem is further configured to analyze stored vehicle state data and stored vehicle contexts from similar types of vehicles to identify the one or more trends.

In certain aspects, the system further comprises a perception subsystem having a plurality of cameras configured to acquire current vehicle state information visually from instruments located in a vehicle.

In certain aspects, the system further comprises a perception subsystem having a plurality of cameras configured to acquire current vehicle state information visually from instruments located in a vehicle cockpit.

In certain aspects, the instruments comprise one or more of a fuel gauge, a temperature gauge, a wind gauge, an odometer, a pressure gauge, an altimeter, a speedometer, an airspeed indicator, a vertical speed indicator, a compass, a gyroscope, an attitude indicator, a heading indicator, a turn indicator, or a navigational system.

In certain aspects, the operator feedback comprises a warning if a deviation between the expected vehicle state and the current vehicle state exceeds a predetermined threshold.

In certain aspects, the current vehicle context is determined based at least in part on one or more of a vehicle type, a vehicle operating handbook, standard vehicle operating procedures, operator input, mission parameters, vehicle destination, current vehicle state data, stored vehicle state data, vehicle position, external environment, and stored trends.

In certain aspects, the vehicle monitoring system is compatible with a different type of vehicle and can be adapted to the different type of vehicle based at least in part on encoded information in a digital file.

In certain aspects, the encoded information comprises one or more of a vehicle type, vehicle layout, vehicle instruments, and vehicle capabilities.

In certain aspects, the analyzed stored vehicle state data, stored vehicle contexts, and stored vehicle states correspond to the vehicle type encoded in the digital file.

In certain aspects, the state monitoring subsystem uses machine learning techniques to identify the one or more trends.

In certain aspects, the adaptable vehicle monitoring system further comprises a perception subsystem configured to acquire current vehicle state information visually from instruments of a vehicle.

In certain aspects, the user interface is a human machine interface (HMI).

In certain aspects, the HMI comprises a tablet.

In certain aspects, the vehicle is an aerial vehicle.

In certain aspects, the perception subsystem acquires current vehicle state data by communicating with the vehicle instruments over a wired or wireless connection.

In certain aspects, the perception subsystem interfaces with the vehicle instruments using a data recorder.

According to a second aspect, a method for providing operator feedback to an operator during operation of a vehicle comprises the steps of: determining a current vehicle context, wherein the current vehicle context reflects an operational mode of the vehicle; deriving a current vehicle state based at least in part on current vehicle state data; correlating the vehicle state data with the current vehicle context as a function of at least one parameter of the vehicle; analyzing the current vehicle state data and the current vehicle context to identify one or more trends; preparing operator feedback based at least in part on a comparison between the current vehicle state and an expected vehicle state, wherein the expected vehicle state is derived based at least in part on one or more stored vehicle states and the one or more trends; and providing the prepared operator feedback to an operator via a user interface.

In certain aspects, the one or more trends are identified using stored vehicle state data, stored vehicle contexts, and stored vehicle states from similar types of vehicles In certain aspects, the current vehicle state data is acquired using a plurality of cameras configured to collect data from instruments in a vehicle cockpit.

In certain aspects, the current vehicle state data is acquired using a plurality of sensors configured to collect data from instruments in a vehicle.

In certain aspects, the vehicle instruments comprise one or more of a fuel gauge, a temperature gauge, a wind gauge, an odometer, a pressure gauge, an altimeter, a speedometer, an airspeed indicator, a vertical speed indicator, a compass, a gyroscope, an attitude indicator, a heading indicator, a turn indicator, or a navigational system.

In certain aspects, the operator feedback comprises a warning if a deviation between the expected vehicle state and the current vehicle state exceeds a predetermined threshold.

In certain aspects, the vehicle monitoring system is compatible with a different type of vehicle, the method further comprising the step of adapting to the different type of vehicle based at least in part on encoded information in a digital file.

In certain aspects, the encoded information comprises one or more of a vehicle type, vehicle layout, vehicle instruments, and vehicle capabilities.

In certain aspects, machine learning techniques are used to identify the one or more trends.

In certain aspects, the method further comprises the step of acquiring current vehicle state data from instruments of a vehicle.

In certain aspects, the user interface is a human machine interface (HMI).

In certain aspects, the HMI comprises a tablet.

In certain aspects, the vehicle is an aerial vehicle.

In certain aspects, the current vehicle state data is acquired by communicating with the vehicle instruments over a wired or wireless connection.

In certain aspects, the current vehicle state data is acquired by interfacing with the vehicle instruments using a data recorder.

In certain aspects, the current vehicle context is determined based at least in part on one or more of a vehicle type, a vehicle operating handbook, standard vehicle operating procedures, operator input, mission parameters, vehicle destination, current vehicle state data, stored vehicle state data, vehicle position, external environment, and stored trends.

In certain aspects, the analyzed stored vehicle state data, stored vehicle contexts, and stored vehicle states correspond to the vehicle type encoded in the digital file.

According to a third aspect, a method of vehicle monitoring comprises the steps of: acquiring current vehicle state data from instruments of a vehicle; determining a current vehicle context; deriving a current vehicle state based at least in part on the vehicle state data and vehicle context; accessing a prior vehicle state and prior vehicle state data; analyzing the current vehicle state data, prior vehicle state data, current vehicle context, prior vehicle state and current vehicle state to identify one or more current trends; comparing the one or more current trends to one or more prior trends to determine if a similar trend exists; preparing feedback based at least in part on the comparison, wherein the feedback comprises an alert in response to a determination that a similar trend exists and that the similar trend is undesirable; and providing the prepared operator feedback to an operator via a user interface.

DRAWINGS

The foregoing and other objects, features, and advantages of the devices, systems, and methods described herein will be readily understood from the following description of particular embodiments thereof, as illustrated in the accompanying figures, where like reference numbers refer to like structures. The figures are not necessarily to scale, emphasis instead being placed upon illustrating the principles of the devices, systems, and methods described herein.

FIG. 3b illustrates an example robotic arm of an example actuation system.

FIG. 4b illustrates an example reformatted image (binary image) of the image of FIG. 4a.

FIG. 4d illustrates another example raw image captured by an imaging system.

FIG. 4e illustrates an example reformatted image of the image of FIG. 4d.

FIGS. 7a and 7b illustrate an example procedure that may be used in the vehicle monitoring system.

DESCRIPTION

Figure 1:
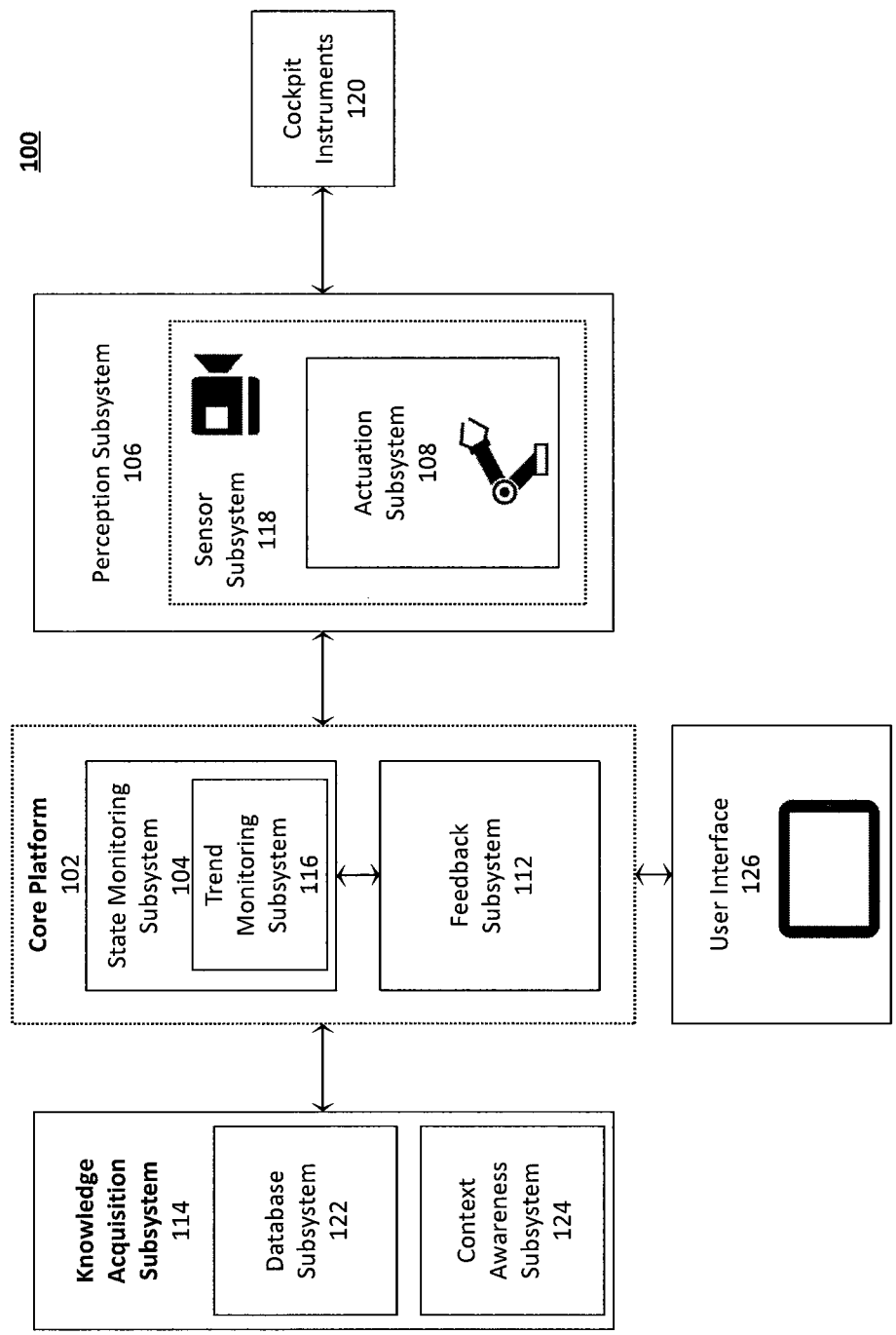
FIG. 1 illustrates a block diagram of an example vehicle monitoring system.

Preferred embodiments of the present disclosure will be described herein below with reference to the accompanying drawings. The components in the drawings are not necessarily drawn to scale, the emphasis instead being placed upon clearly illustrating the principles of the present embodiments. For instance, the size of an element may be exaggerated for clarity and convenience of description. Moreover, wherever possible, the same reference numbers are used throughout the drawings to refer to the same or like elements of an embodiment. In the following description, well-known functions or constructions are not described in detail because they may obscure the disclosure in unnecessary detail. No language in the specification should be construed as indicating any unclaimed element as essential to the practice of the embodiments. For this application, the following terms and definitions shall apply:

The terms "aerial vehicle" and "aircraft" refer to a machine capable of flight, including, but not limited to, both traditional runway and vertical takeoff and landing ("VTOL") aircraft. VTOL aircraft may include fixed-wing aircraft (e.g., Harrier jets), rotorcraft (e.g., helicopters), and/or tilt-rotor/tilt-wing aircraft.

The term "and/or" means any one or more of the items in the list joined by "and/or." As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y and/or z" means "one or more of x, y and z".

The terms "communicate" and "communicating" refer to (1) transmitting, or otherwise conveying, data from a source to a destination, and/or (2) delivering data to a communications medium, system, channel, network, device, wire, cable, fiber, circuit, and/or link to be conveyed to a destination.

The terms "about" and/or "approximately," when used to modify or describe a value (or range of values), position, orientation, and/or action, mean reasonably close to that value, range of values, position, orientation, and/or action. Thus, the embodiments described herein are not limited to only the recited values, ranges of values, positions, orientations, and/or actions but rather should include reasonably workable deviations.

The terms "circuits" and/or "circuitry" refer to physical electronic components (i.e., hardware), such as, for example analog and/or digital components, power and/or control elements, and/or a microprocessor, as well as any software and/or firmware ("code") which may configure the hardware, be executed by the hardware, and or otherwise be associated with the hardware.

The terms "coupled," "coupled to," and "coupled with" as used herein, each mean a structural and/or electrical connection, whether attached, affixed, connected, joined, fastened, linked, and/or otherwise secured. The term "attach" means to affix, couple, connect, join, fasten, link, and/or otherwise secure. The term "connect," means to attach, affix, couple, join, fasten, link, and/or otherwise secure.

The term "operatively coupled" means that a number of elements or assemblies are coupled together, such that as a first element/assembly moves from one state (and/or configuration, orientation, position etc.) to another, a second element/assembly that is operatively coupled to the first element/assembly also moves between one state (and/or configuration, orientation, position etc.) to another. It is noted that a first element may be "operatively coupled" to a second element without the opposite being true.

The term "processor" means processing devices, apparatuses, programs, circuits, components, systems, and subsystems, whether implemented in hardware, tangibly embodied software, or both, and whether or not it is programmable. The term "processor" as used herein includes, but is not limited to, one or more computing devices, hardwired circuits, signal-modifying devices and systems, devices and machines for controlling systems, central processing units, programmable devices and systems, field-programmable gate arrays, application-specific integrated circuits, systems on a chip, systems comprising discrete elements and/or circuits, state machines, virtual machines, data processors, processing facilities, and combinations of any of the foregoing. The processor may be, for example, any type of general purpose microprocessor or microcontroller, a digital signal processing (DSP) processor, an application-specific integrated circuit (ASIC). The processor may be coupled to, or integrated with a memory device.

The term "exemplary" means serving as a non-limiting example, instance, or illustration. As utilized herein, the terms "e.g.," and "for example" set off lists of one or more non-limiting examples, instances, or illustrations.

The term "memory" means computer hardware or circuitry to store information for use by a processor and/or other digital device. The memory can be any suitable type of computer memory or any other type of electronic storage medium, such as, for example, read-only memory (ROM), random access memory (RAM), cache memory, compact disc read-only memory (CDROM), electro-optical memory, magneto-optical memory, solid state memory, programmable read-only memory (PROM), erasable programmable read-only memory (EPROM), electrically-erasable programmable read-only memory (EEPROM), a computer-readable medium, or the like. The term "database" may refer to a particular structuring of data in memory.

The present disclosure is directed to a vehicle monitoring system that provides real-time feedback to an operator based at least in part on monitoring of a current vehicle state (and/or a change and/or transition of a vehicle state) in a given context, as compared with an expected and/or desired vehicle state in a similar context. The state of the vehicle refers to the both vehicle-specific state (e.g., control status, aircraft configuration, aircraft health, and the like) and flight-specific state (e.g., aircraft's location relative to flight plan or geographical features, location, position, attitude, and the like). The system may additionally, or alternatively, base its feedback on a comparison of a current vehicle state data, with a given threshold, comparison of a current vehicle state with a given threshold, comparison of a predicted vehicle state with a future expected vehicle state, and/or trend analysis informed by machine learning. The current vehicle state data may be gleaned from one of more instruments of the vehicle (e.g., those in the cockpit, cab, dashboard, etc.). The present disclosure may be particularly applicable to aerial vehicles. The present disclosure may combine vehicle state awareness (based at least in part on instruments, switch settings, geolocation, mission data, and other indicators of vehicle configuration and/or mission state) with trend monitoring to provide feedback. Feedback may include suggested corrections, warning, and/or alerts. In some examples, feedback may include modification of the operation of the vehicle. Appropriate and/or timely feedback may increase the level of safety and/or operator awareness of impending unsafe conditions.

The disclosed system may determine vehicle state at least in part using data acquired via a perception subsystem. The perception subsystem may acquire data using tools such as cameras, sensors, data recorders (e.g., flight data recorders), and/or other sources of information. In some examples, such as where the vehicle may be a ground, aerial, and/or water vehicle, the perception subsystem may, for example, acquire data from instruments in a cockpit. In examples where a camera is used, specialized machine-vision techniques may be applied to read the cockpit instruments and/or deduce switch positions and/or cockpit state, in a manner similar to the way pilots and/or operators visually check the cockpit state. In some examples, the perception subsystem may interface with existing devices that provide instrument readings, switch settings, and/or vehicle state. In examples where the vehicle is an aerial vehicle, a flight data recorder may be used to interface with existing devices that provide instrument readings, switch settings, and/or aircraft flight state.

The system may infer and/or determine vehicle state using and/or based on data acquired via the perception subsystem, in conjunction with context information. Generally speaking, a vehicle state data (or information) refers to status information of the vehicle that a user (e.g., pilot or other operator) may use to maintain (or perform) a particular operational mode (e.g., a flight operation), such as those provided by the instruments of a dashboard, cab, or cockpit. Depending on the type of vehicle (e.g., whether aerial, land-based, or water-based), examples vehicle states include, inter alia, fuel level, altitude, speed, engine condition, flaps location/position, etc. In terms of aerial vehicles, a flight specific state reflects a relative location of the vehicle (e.g., relative to an object or another location, destination, and the like), location relative to mission (e.g., a flight path), environmental conditions, temperature, etc. For clarity, a vehicle state data is not limited to state related to guidance, navigation, and control (GNC). Vehicle state data, however, does not reflect vehicle context data. Indeed, the same vehicle state data may have more or less relevancy depending on the particular context in which the vehicle is operating (i.e., a particular operational mode, such as cruise, take off, taxi, landing, etc.). For example, a vehicle monitoring system may be provided with an abundance of vehicle state data through one or more systems, which may be necessary or useful for certain operational modes, but not all operational modes. When a context is provided (e.g., in the form of context data), the vehicle monitoring system can prioritize the portions of the vehicle state data. For example, when taxiing, the vehicle monitoring system does not require information about altitude because that state data is irrelevant. Therefore, other state data would be prioritized, such as speed, flap positions, etc. As such, vehicle state data may be prioritized (e.g., weighted) or selected as a function of the identified or received context data. The disclosed system may further adapt such prioritization or selection logic based on vehicle state data prioritization or selection trends per context data.

The vehicle monitoring system may use context information to process state data from the perception subsystem appropriately and/or to determine appropriate feedback. The system may take information from various components and/or storage devices to synthesize a context. In some examples the system may infer vehicle context based at least in part on vehicle state. In some examples, context may be based at least in part on data acquired through the perception subsystem. For example, the perception subsystem may acquire data regarding the outside temperature, humidity, precipitation, pressure, wind speed, etc., and the system may infer a particular location, destination, procedure, and/or mission context based on the perceived temperature, humidity, precipitation, pressure, and/or wind speed. As another example, the perception subsystem may acquire data relating to the geolocation of the vehicle, and the system may infer a context based on the geolocation (e.g., country, geography, topography, weather patterns, climate, destination, route, etc.). In some examples, context relating to current operational mode and/or procedure may be obtained through, for example, an operation checklist and/or a pilots operating handbook stored in memory. Context may include the vehicle destination and/or mission, the current operational mode and/or procedure being undertaken, a checklist and/or set of tasks to be undertaken, and/or the condition and/or status of the surrounding environment.

In some examples, the system may infer vehicle state based at least in part on a vehicle context combined with data from the perception system. This process may inform the operator feedback scheme further outlined below. The system may, for example, track the progression of an operator and/or vehicle in a given operational checklist, and make an inference as to vehicle state based on the progression. In some examples, the system may obtain and/or infer context and/or state based on trends and/or patterns exposed through machine learning examination of recently recorded and/or previously recorded vehicle monitoring system datasets.

Figure 7B:
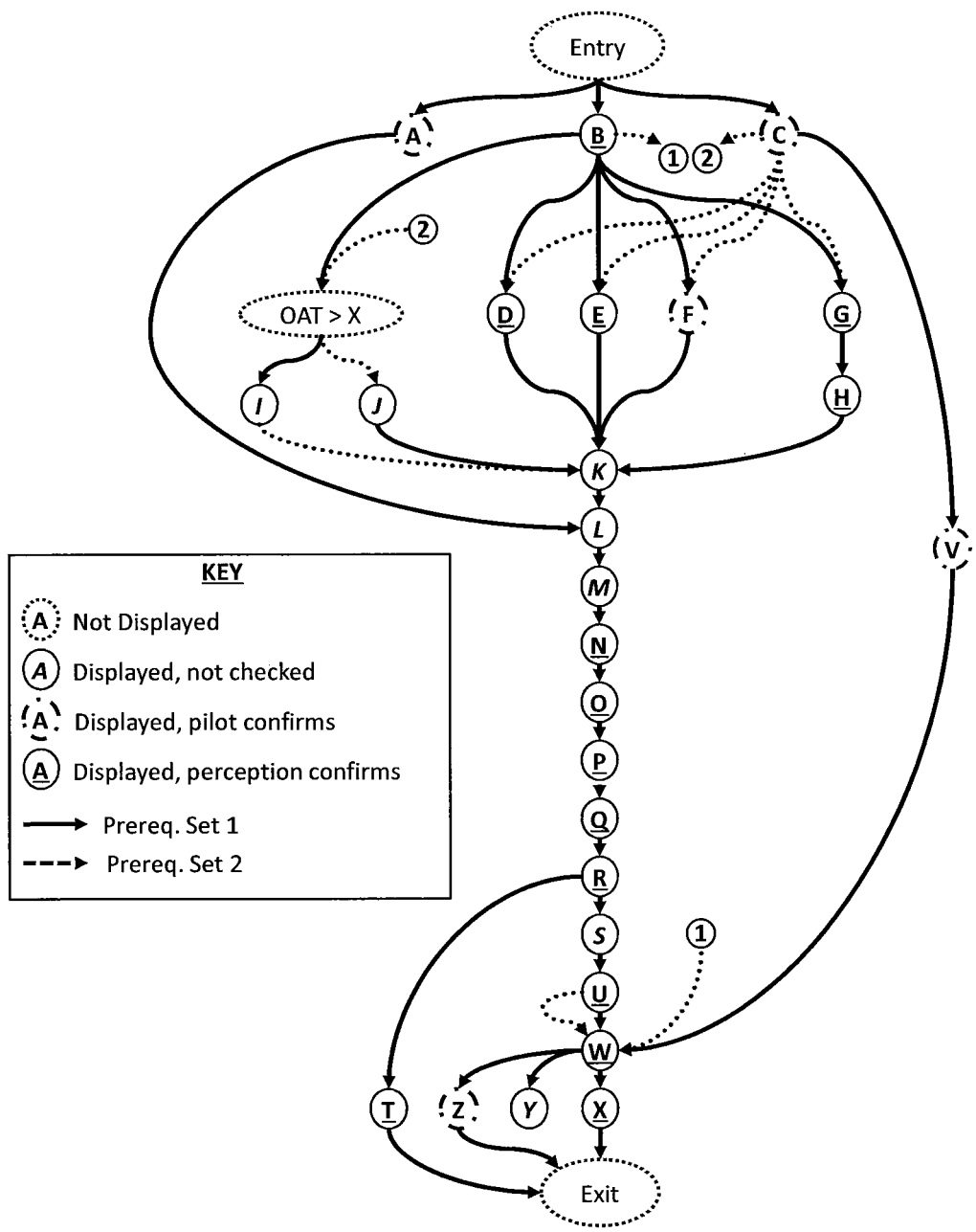

The transition from one vehicle context and/or state to another may be complex. In some examples, the transition may comprise an operator carrying out a variety of steps, and conditions changing in response, either in very specific order or in an operator discretionary way, so as to configure the vehicle in such a way as to be suitable for the current operational mode/phase and/or intended next operational mode and/or phase of flight. FIGS. 7a and 7b illustrate this flow for a single procedure (e.g., from an aircraft pilot's operating handbook). Execution of each step may be verified ("checked") by the perception subsystem, and satisfaction may be represented by an arrow (a pre-requisite) in the diagram. Pre-requisites are organized in 'sets'—execution of a particular step of the checklist is 'enabled,' or ready to be executed, when any one of potentially multiple pre-requisite sets are complete (arrows coming into the step are activated). Sets are distinguished by arrow color in the diagram. Various pathways to complete the checklist are thus represented, and flow through the procedure does not entail rote operation by the operator, who can satisfy the requirements of the checklists by taking multiple pathways through the checklist, which may themselves be context-dependent. In addition, the availability of data may require that some items be verified manually by the pilot ('displayed, pilot confirms'). Other items may not be available but are of low enough consequence that they need not be confirmed by the system ('displayed, not checked'). Finally, some items may be internally confirmed by the system but not displayed to the pilot ('not displayed').

It is also the case that the vehicle can proceed to a different context and/or state either by virtue of completion of a checklist, or by virtue of external events such as radio calls, and/or arrival at a location. In turn, occurrence of a new context and/or state may trigger the necessity to carry out a new checklist. As indicated above, some of the transitions in this diagram may be triggered by checklist execution, while others may be context-dependent. In turn, the mission state can trigger checklists to be executed.

The system may use the state awareness developed through the acquired data and/or obtained context to provide feedback to the vehicle operator. Feedback may include, for example, real-time operator aids, suggestions, reminders, alerts, warnings, etc. In some examples, the system may compare the current state of the vehicle to a set of conditionals and/or flow processes that are maintained in real time, and provide feedback based on the result of this comparison. In some examples, the system may compare the current state of the vehicle to a desired and/or expected vehicle state, given the current conditions (e.g., flight conditions) and/or mission context. In some examples, the comparison and/or any feedback resulting from the comparison may be based at least in part on the current vehicle configuration, as explained more below. Feedback monitoring may be flexible enough to account for variances in operator behavior, tendencies, habits, peculiarity, eccentricities, quirks, preferences, etc. Furthermore, the feedback subsystem may be robust enough to avoid false alarms, while still enabling efficient configuration and reconfiguration of the system to optimize, over time, the functionality. The system may employ specialized logic flow and real-time data to work smoothly with operators, avoiding alerts or warnings if checklists are performed properly but in acceptable sequences that vary from operator to operator. Through the integration of these functions, the disclosed system may increase operator performance and/or overall vehicle safety.

Feedback may be provided using a user interface (UI) such as, for example, a graphical user interface (GUI) and/or human machine interface (HMI). In some examples, the user interface may be implemented with a mobile device, such as a cellular device, a tablet, a smart TV, an e-book reader, a personal digital assistant (PDA), and/or some other appropriate device. In some examples, the user interface may include visual and/or audio cues, a touch screen interface, speech and/or voice recognition and synthesis, as well as haptics, vibrations and/or other tactile cues. In some examples, the user interface may include a moving map to provide awareness of state within the airspace and mission, checklists to provide monitoring and suggestions about checklist execution, off-nominal conditions and appropriate checklists for these conditions, and information (such as radio frequencies, Notices to Airmen (NOTAMs), and mission point GPS locations) that aid the vehicle operational modes.

In some examples, the disclosed system may be adaptable and/or re-configurable, so as to be compatible with different types of vehicles or other hardware system components. For example, the system may adapt and/or reconfigure itself according to parameters, procedures, arrangements, formats, instructions, and/or other information encoded in a digital file. The parameters, instructions, and/or other information may be specific to the particular vehicle intended to be used with the system. The resulting "Digital Type Rating" (DTR) file may adapt and/or configure the system for the specifics of a vehicle (e.g., an aerial vehicle) without need for costly re-work of the software. The file may, for example, encode vehicle instrument positions, functions, and/or operable thresholds, procedures, sequences, and/or checklists particular to the specific vehicle, mission profiles specific to the particular vehicle, top speed/acceleration, fuel capacity, tire grade, wing span, lift surfaces, control surfaces, propulsion systems, etc. In some examples, each subsystem of the disclosed system (e.g., perception subsystem, user interface, core platform, and/or knowledge acquisition subsystem) may be reconfigurable for vehicle compatibility according to file encoded information. In some examples, the DTR files may be encoded based on operating handbooks and vehicle operational specifics.

By evaluating the perceived vehicle state data in combination with the vehicle/mission/procedural context, and/or vehicle configuration, along with the ability to reconfigure the system to suit different vehicles, equipment, and/or missions/procedures, the system can ensure that the right information is provided to the operator at the right time. Trend monitoring may be performed during operation of the vehicle and/or before/after operation. Feedback to the operator may be prepared to provide warnings based on detected deviation from normal and/or expected operation.

In addition to state transitions, configuration changes, and associated procedures, the time-variation of instrument readings in the cockpit may provide information about the health and/or status of vehicle operational modes. The time variation of combinations of instruments may also provide an indication of various potential problems. For instance, a combination of speed, temperature, and humidity may indicate the potential for icing, which may require remediation by the operator. Another example is the engine state—a variety of instruments provide information to the operator about whether engine operation is within bounds, but only by looking at the relative values and relating it to the state of flight (climb, descent, taxi) can the operator deduce whether engine overheating is expected or maintenance is required. In some cases, trends in readings (such as engine temperature) over time may indicate the necessity for maintenance or the potential onset of a failure. Other cases that might require machine learning trend analysis before/after operation may have to do with operator decisions; for instance, if the operator decides a go-around is necessary, the computer system may infer that the current phase of flight has changed from approach to climb out, and monitor and advise accordingly. All of these functions may be best carried out before/after operation by performing machine learning and/or trend/pattern recognition based on past experience, combined with trend/pattern monitoring against learned behaviors during operation.

To accommodate this need, the system may both on-line (during operation) and off-line (before/after operation) elements. The off-line elements may be configurable trend analytic and machine learning elements that take data from many past flights, recorded by the system and/or tagged with the derived information about state and context. These elements may distill data into information about relationships between variables, which may be recorded as part of the configuration process, and periodically updated. The recorded configuration information may be used by the on-line trend monitoring system, which may compare measured data and/or combinations of that data against norms established in previous flights, and/or other sources of 'training' on what relationships may represent need for alerting or triggering of emergency or other procedures.

The entire system may be configured using a Knowledge Acquisition (KA) subsystem. The KA subsystem may generate one or more DTR files that may be transferrable to a vehicle's onboard computer and/or a vehicle monitoring subsystem. Based on the provided vehicle configuration (via the DTR file), a current state, one or more past states, one or more predicted states, and/or one or more trends the system may determine whether the vehicle operation is appropriate for the current context, whether operations are being carried out within norms (as customized by the KA/DTR process as well as off-line trend analytics), and/or what checklist reminders, warnings, and/or alerts need to be displayed (see, e.g., FIGS. 7a, 7b, and 8). These alerts may be communicated to the UI, which may provide visual and/or audio cues, a touch interface, speech recognition and synthesis, and vibrations or other tactile cues. After operation, and/or as part of normal data recorder (e.g., flight data recorder) data downlink and/or storage, off-line data analytics software may performs analysis necessary to inform onboard trend monitor functions about normal operating relationships that exist between variables. In this way the trend monitoring maintains a continually updated awareness of what constitutes 'normal' operation of the system.

Knowledge acquisition, and/or the management of the configuration of the system, may be carried out through DTR files, which may encode procedures, trend monitor configurations, and/or other vehicle knowledge. This may allow for efficient customization to a given vehicle. The KA subsystem can function as the procedure editor that creates the DTR files. Thus reading from the DTR is essentially the same as inputs from the KA system. The vehicle monitoring system may receive, whether in real-time or from a database, the DTR files, and/or take input from the KA subsystem and/or perception subsystem to maintain vehicle state and/or context, and to generate appropriate feedback to the UI.

Because the system performs many parallel functions, a wide variety of variations are possible. The inputs can come from a variety of sources or combination of such sources. The monitoring and analytics functions, and the process of tying these functions to vehicle operations, can be performed in whole or in part, leading to various levels and/or contexts of operator aiding—for instance the system could be used for checklist monitoring only, or solely for advising on radio frequencies to employ, or entirely for monitoring engine trends. Outputs could be to other displays or devices than a tablet, which might involve communication back to vehicle deck components (MFD or PFD), and/or a device for voice synthesis, or tactile devices in the operator's suit or gloves. Finally, software functionalities that rely on the inputs and outputs of the system could be expanded or modified.

Most currently-fielded systems have no 'state awareness' and/or context awareness based on which to raise warnings, provide reminders, and/or interact with the pilot. As such, they cannot provide good, context sensitive information. Context awareness in the most advanced cockpits exists by virtue of being highly integrated and costly. The advantage of the present disclosure over such systems is that it may be made adaptable to most (if not all) vehicles (through the KA/DTR aspect) and may not rely on a tightly integrated infrastructure. Even the most sophisticated existing systems, or those under current development, do not incorporate the level of procedural knowledge with feedback to the operator. As explained above, vehicle state data reflects the status of various aspects of the vehicles, while the context data can be used to identify (or weigh) certain portions of the vehicle state data differently. The system may use its knowledge data from a knowledge acquisition subsystem to correlate vehicle state data with a context. The knowledge data is a basis for decision making and procedure implementation. For example, knowledge acquisition subsystem may codify pilot operation handbook in the form of knowledge data, which may then be used to weigh certain vehicle state data as a function of both the context and a predetermine procedure (e.g., as set forth in the operation handbook). The knowledge acquisition subsystem may further use machine learning techniques to improve its rules and/or procedures based on historic data.

FIG. 1 illustrates an example architecture of a vehicle monitoring system 100 in accordance with one example. The vehicle monitoring system 100 may be implanted in and/or adapted to several types of vehicles, including, but not limited to, aerial vehicles, aquatic vehicles, land vehicles, and/or subterranean vehicles.

Core Platform. With reference to FIG. 1, the vehicle monitoring system 100 may comprise a core platform 102 having a state monitoring subsystem 104 and/or a feedback subsystem 112. The core platform 102 may also be operatively coupled with a plurality of other subsystems. The core platform 102 may operate as a central subsystem, middleware, and/or common data bus; connecting the various subsystems of the vehicle monitoring system 100 via one or more interfaces. The subsystems may communicate with one another through software and/or hardware interfaces using wired and/or wireless communication protocols and hardware. The core platform 102 may coordinate and/or facilitate communication between, among, and/or through the various subsystems. In some examples, the various subsystems may bypass the core platform 102 when communicating with one another. In some examples, the core platform 102 may function as and/or with an operating system, such as Linux, for example. In some examples, the core platform 102 may be implemented in a computer chip, application specific integrated circuit (ASIC), and/or a motherboard, such as, for example, a Pico-ITX motherboard.

Each of the plurality of subsystems of the system 100 may be integral and/or modular, thereby allowing the entire vehicle monitoring system 100 to be substantially ported to another vehicle rapidly. The plurality of subsystems may include, for example, a user interface (UI) 126, a perception subsystem 106, an actuation subsystem 108, a sensor subsystem 118, a knowledge acquisition (KA) subsystem 114, a trend monitoring subsystem 116, a database subsystem 122, and/or a context awareness subsystem 124. Each subsystem may be operatively coupled with the core platform 102. While the actuation subsystem 108 and the perception subsystem 106 are illustrated as part of a single system (e.g., a pan-tilt-zoom (PTZ) camera could have its actuation under the perception system), the actuation subsystem 108 and the perception subsystem 106 may instead be provided via two distinct systems or hardware components. Depending on the configuration, the vehicle monitoring system 100 may be configured with fewer or additional modules, components, and/or systems without departing from the spirit and scope of the disclosure.

To enable a vehicle-agnostic vehicle monitoring system 100, the processor-based core platform 102 may provide, and/or otherwise serve as, a middleware that can be made specific to a particular vehicle and/or configuration through an initialization and/or setup phase. The core platform 102 may be reconfigurable and/or adaptable, and/or facilitate reconfiguration and/or adaptability of the vehicle monitoring system 100 and/or its various subsystems, so as to be compatible with different types of vehicles. For example, the core platform 102 may reconfigure itself and/or facilitate reconfiguration of the various subsystem of the vehicle monitoring system 100 according to parameters, procedures, arrangements, formats, instructions, and/or other information encoded in one or more digital files, such as a "Digital Type Rating" (DTR) file. The parameters, instructions, and/or other information encoded in the DTR file may be specific to the particular vehicle intended to be used with the system. The core platform 102 may decode and/or decipher the information in the DTR file to adapt and/or reconfigure the system 100 for the specifics of a particular vehicle without need for costly re-work of the software and/or hardware of the system 100 and/or the vehicle. For example, the core platform 102 may adapt and/or reconfigure the system 100 for operation with an aerial vehicle, an aquatic vehicle, and/or a land vehicle, without need for costly rework. In some examples, the core platform 102 may adapt and/or reconfigure the vehicle monitoring system 100 for operation with different classes, categories, makes, and/or models of similar type vehicles without costly rework (e.g., small/large cargo airplanes v. small/large passenger airplanes v. propeller planes v. jet engine planes). The DTR file may, for example, encode vehicle instrument positions, functions, and/or operable thresholds, procedures, sequences, and/or checklists particular to the specific vehicle. The DTR file may additionally, or alternatively, for example, encode mission profiles specific to a particular vehicle, top speed/acceleration, fuel capacity, tire grade, wing span, lift surfaces, control surfaces, propulsion systems, etc. In some examples, each subsystem of the disclosed system may be reconfigurable for vehicle compatibility according to DTR file encoded information, translated by and/or through the core platform 102. In some examples, the DTR files may be encoded based on operating handbooks and vehicle operational specifics.

The core platform 102 may serve as the primary autonomous agent and/or decision-maker, synthesizing inputs from the perception subsystem 106, user interface 126, and/or KA subsystem 114 to determine a current vehicle state. The core platform 102 may process inputs from the KA subsystem 114 to determine an expected vehicle state, compare the expected system state to the actual system state, and determine any appropriate feedback to the operator through the user interface 126.

State Monitoring Subsystem. The state monitoring subsystem 104 may determine and/or otherwise perceive a real-time state of the vehicle. "State," as used herein, may refer to a broad categorization and/or classification of the vehicle that encompasses a variety of information about the vehicle in a given context. The vehicle state may be used by an operator to perform vehicle operations. The vehicle state may additionally, or alternatively, be used by the feedback subsystem 112 to determine appropriate operator feedback. In some examples, the state monitoring subsystem 104 may predict and/or derive one or more future states based on the current state, one or more previously recorded states, current vehicle state data, previously recorded vehicle state data, current vehicle context, previously recorded vehicle context and/or information from the perception subsystem 106, knowledge acquisition subsystem 114, and/or user interface 126.

The state monitoring subsystem 104 may perceive the real-time vehicle state through, inter alia, a direct connection (e.g., integral with or otherwise hardwired) to the vehicle. Alternatively, or additionally, the state monitoring subsystem 104 may derive vehicle state based on information received from the perception subsystem 106 and/or the context awareness subsystem 124. When the perception subsystem 106 is used, the state monitoring subsystem 104 may include a dedicated controller (e.g., processor) and/or share the controller 302 of the perception subsystem 106.

Trend Monitoring Subsystem. The state monitoring subsystem 104 may include a trend monitoring subsystem 116. A "trend" as used herein may refer to one or more relationships between one or more vehicle states, vehicle contexts, vehicle state/context transitions, operator observations, vehicle state data, and/or perceived vehicle instrument data over a time period. The trend monitoring subsystem 116 may use machine learning to monitor and/or analyze changes in vehicle states, vehicle contexts, vehicle state/context transitions, operator observations, vehicle state data, and/or perceived vehicle instrument data over time to identify trends and/or patterns. The trend monitoring subsystem 116 may additionally, or alternatively, use other data from the perception subsystem 106, context awareness subsystem 124, and/or knowledge acquisition subsystem 114 to assist in its trend recognition. In some examples, the trend monitoring subsystem 116 may analyze and/or determine operator trends based on observations of the operator in conjunction with instrument, context, state, and/or other data.

The trend monitoring subsystem 116 may be trained to recognize trends/patterns using machine learning techniques in conjunction with data recorded from prior application of the vehicle monitoring system 100, other vehicle monitoring systems, and/or other methods. In some examples, the trend monitoring subsystem 116 may be trained prior to installation, upload, and/or initialization of the vehicle monitoring system 100. In some examples, the trend monitoring subsystem 116 may be trained on data specific to the class, category, type, make, and/or model of vehicle being monitored (or that is planned to be monitored) by the vehicle monitoring system 100. In some examples, information describing a trained trend monitoring system 116 may be encoded in a DTR file, such that an untrained trend monitoring system 116 may be configured with the same knowledge as the trained trend monitoring system 116 in a short time period by loading the DTR file in the vehicle monitoring system 100.

The trend monitoring subsystem 116 may analyze data from the database subsystem 122, perception subsystem 106, and/or state monitoring subsystem 104 to identify patterns and/or trends. In some examples, the trend monitoring subsystem 116 may identify both current trends identified from the recently recorded data of the vehicle monitoring system 100, and past trends identified from prior application of the vehicle monitoring system 100 and/or other vehicle monitoring systems. In some examples, the trends identified by the trend monitoring subsystem 116 may be analyzed to determine whether a current vehicle trend is similar to a past trend. In situations where a current trend is similar to a past trend, and the past trend resulted in unfavorable, dangerous, and/or undesirable consequences, the feedback system 112 may prepare and/or provide appropriate feedback to an operator through a user interface 126 (e.g., alerts, warnings, recommended corrective action, etc.).

Feedback Subsystem. The core platform 102 may provide the vehicle monitoring system 100 with a feedback subsystem 112. The feedback subsystem 112 may prepare feedback for one or more vehicle operators and/or deliver the feedback to the operator(s) through the user interface 126. The feedback may be based on comparisons between relatively recently recorded data of the vehicle monitoring system 100 and stored and/or generated data.

In some examples, the feedback subsystem 112 may be configured to compare a current state of the vehicle to an expected state of the vehicle, and prepare feedback accordingly. For instance, if the current state is substantially different from the expected state, the feedback subsystem 112 may prepare and/or deliver an alert and/or warning to the operator(s) through the user interface 126. In some examples, the feedback subsystem 112 may compare one or more current and/or recent states against one or more thresholds. The thresholds may, for example, be defined in operational documentation for the specific vehicle (e.g., never exceed a predetermined speed, engine temperature, etc.). In some examples, the feedback subsystem 112 may compare one or more predicted future states against one or more thresholds and/or one or more expected states. In some examples, the feedback subsystem 112 may compare vehicle state data recorded by the perception system 106 against one or more thresholds. In situations where the comparisons are unfavorable, indicate anomalies, and/or significant deviations, the feedback system may prepare and/or provide appropriate feedback to an operator through a user interface 126 (e.g., alerts, warnings, recommended corrective action, etc.).

In some examples, the feedback subsystem 112 may compare a current identified trend with similar trends, and prepare and/or deliver feedback accordingly. For instance, if the current trend is similar to a past trend (recognized from prior recorded data) that led to a potentially dangerous and/or undesirable situation, the feedback subsystem 112 may prepare and/or deliver an alert and/or warning to the operator(s) through the user interface 126.

In some examples, where the feedback subsystem 112 determines that an alert and/or warning would be appropriate, the feedback subsystem 112 may recommend corrective action. The corrective action may, for example, be based on corrective action and/or trends performed in previous similar situations, as may be identified by the trend monitoring subsystem 116. In some examples, the corrective action may be based on one or more checklists and/or procedures recorded in a context database 504. In some examples, the corrective action may be based on information in the vehicle configuration database 502. In some examples, the corrective action may be based on input from an operator through the user interface 126.

Figure 2A:
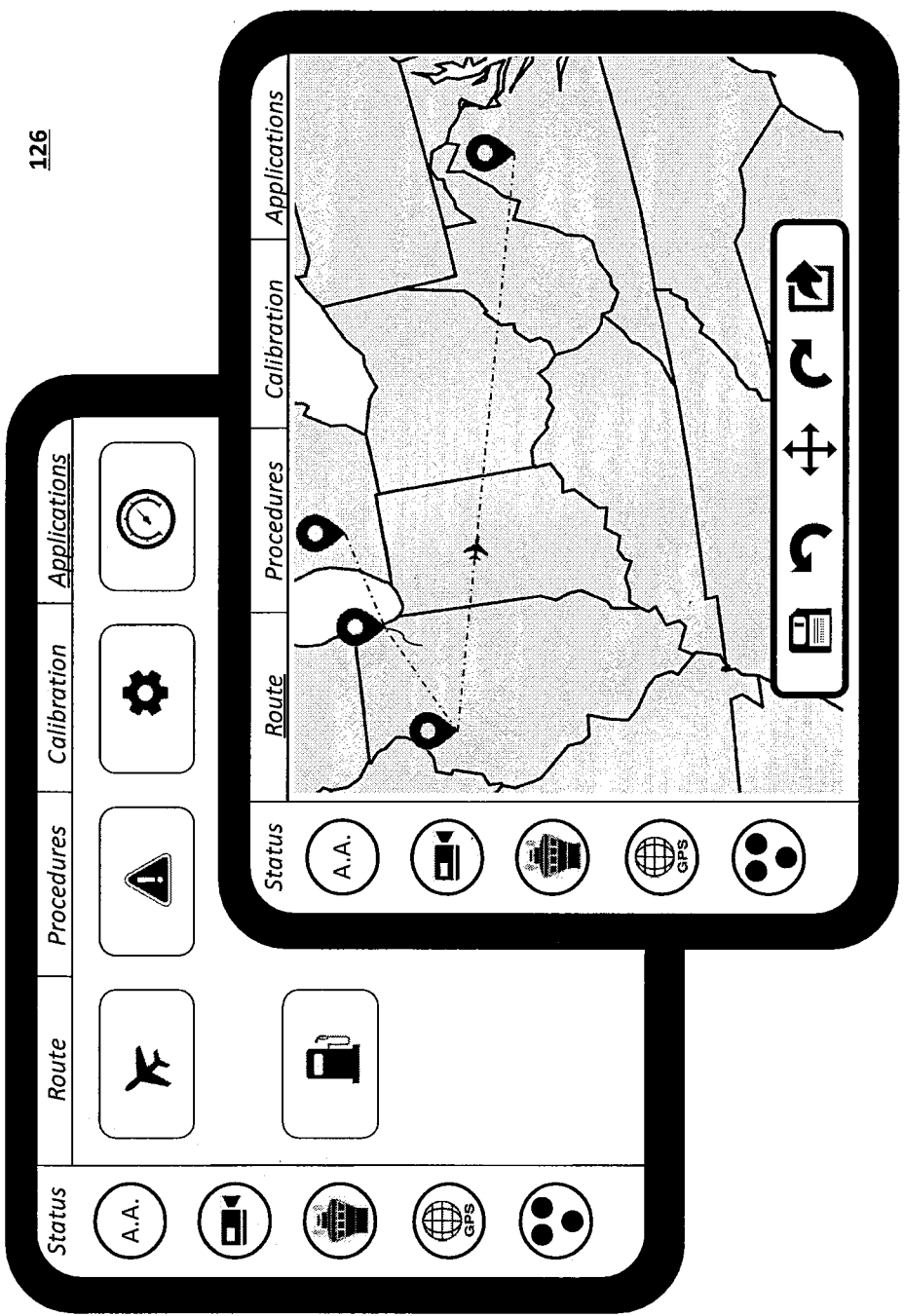
FIG. 2a illustrates a first example user interface displaying a route application.
Figure 2B:
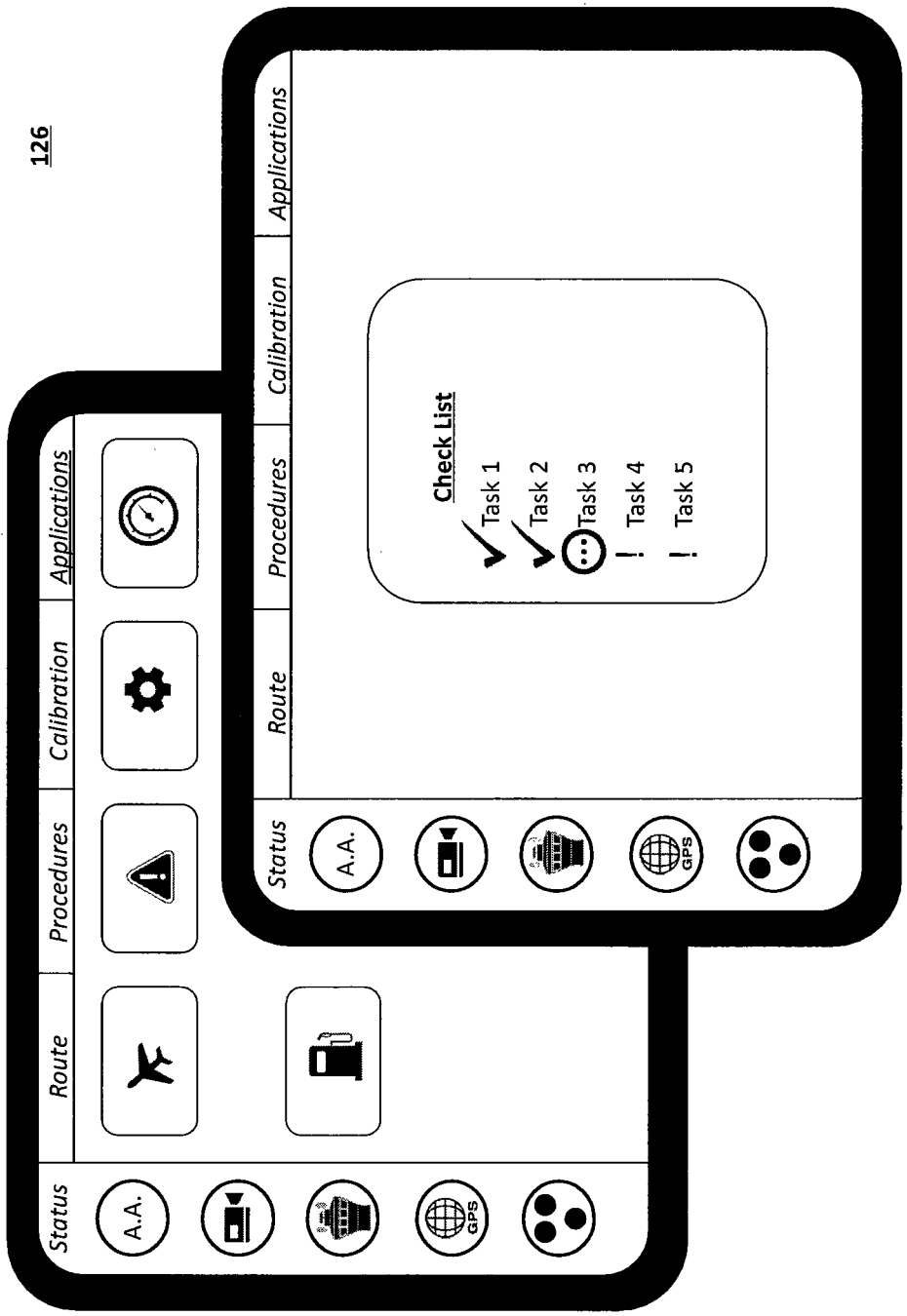
FIG. 2b illustrates a second example user interface displaying a procedural checklist.

User interface (UI) 126. The user interface 126 may provide a control and/or communication interface for an operator (e.g., a human operator). The operator may be remote (e.g., outside the vehicle and/or in another vehicle) or on-board (i.e., in the vehicle). The user interface 126 may include a human-machine interface (HMI), which may be based on a touch screen graphical user interface ("GUI") and/or speech-recognition systems. An objective of the user interface 126 is to enable the operator to interact with the core platform 102's knowledge base in manner akin to the way an operator interacts with a human flight engineer and/or copilot. The user interface 126 may serves as a primary channel of communication between the operator(s) and the vehicle monitoring system 100. For example, the user interface 126 may receive status information from a subsystem via the core platform 102, while sending to the core platform 102 mode commands generated by the user interface 126 and/or input by the operator(s). The user interface 126 may employ a tablet based GUI and/or a speech-recognition interface to enable vocal communications. As illustrated, for example, in FIGS. 2a and 2b, the user interface 126 may provide an intuitive display and interface that includes checklist verification from the core platform 102 and/or predictions of vehicle state (e.g., fuel consumption and predicted remaining range), as well as mapping functions, failure prognosis, and/or deviation alerts (e.g., "Left engine EGT is 5 degrees above normal and rising").

The user interface 126 may include one or more external communication ports, such as, for example, universal serial bus (USB) ports, that may allow the user interface 126 to be operatively coupled (and/or interfaced) with other electronic devices, such that the vehicle monitoring system 100 may communicate with the external device(s) through the external communication port of the user interface 126. The user interface 126 may be further configured with wireless communication capabilities, such as, for example, through Bluetooth, near field communication, radio frequency (RF) communication, Wireless Fidelity (Wi-Fi) communication, and/or other suitable wireless communication methods.

The user interface 126 may display, via a display device (e.g., a liquid crystal display (LCD)), the current state of vehicle monitoring system 100 (its current settings and responsibilities) as well as which operational applications are currently installed, which operational applications are running and, if they are active, which actions the operational applications are taking. The user interface 126 may also be night-vision goggles compatible such that it is visible regardless of the operator's eyewear. The speech-recognition system may be used to replicate the same types of verbal communications used by humans when running through checklists and/or communicating. In certain aspects, the speech recognition may be limited to the same standards of codified communications used by operator teams to minimize the chances of the system failing to recognize commands or changing into inappropriate modes of operations. The speech-recognition system may be configured to learn/recognize the speech of one or more operators through a voice training protocol. For example, the operator may speak a predetermined script such that the speech-recognition system can become trained with the operator's dialect.

The display of the user interface 126 may be customized by the operator. For example, the operator may wish to add, reorganize, and/or remove certain of the display icons and/or operational applications. The user interface 126 may further inform the operator regarding the vehicle's operating status and/or to provide the operator with feedback (e.g., instructions and/or advice).

Perception subsystem. The perception subsystem 106 may collect, sense, measure, detect, determine, and/or otherwise perceive real-time vehicle and/or environment situation data. The situation data perceived by the perception subsystem 106 may be used to derive the vehicle state, vehicle context, one or more trends, and/or generate operator feedback. In some examples, the perception subsystem 106 may additionally, or alternatively, collect, sense, measure, detect, determine, and/or otherwise perceive real-time operator observations. Such observations may include, for example, operator actions, reactions, response timing, preferences, and/or other information relating to the operator.

Figure 3A:
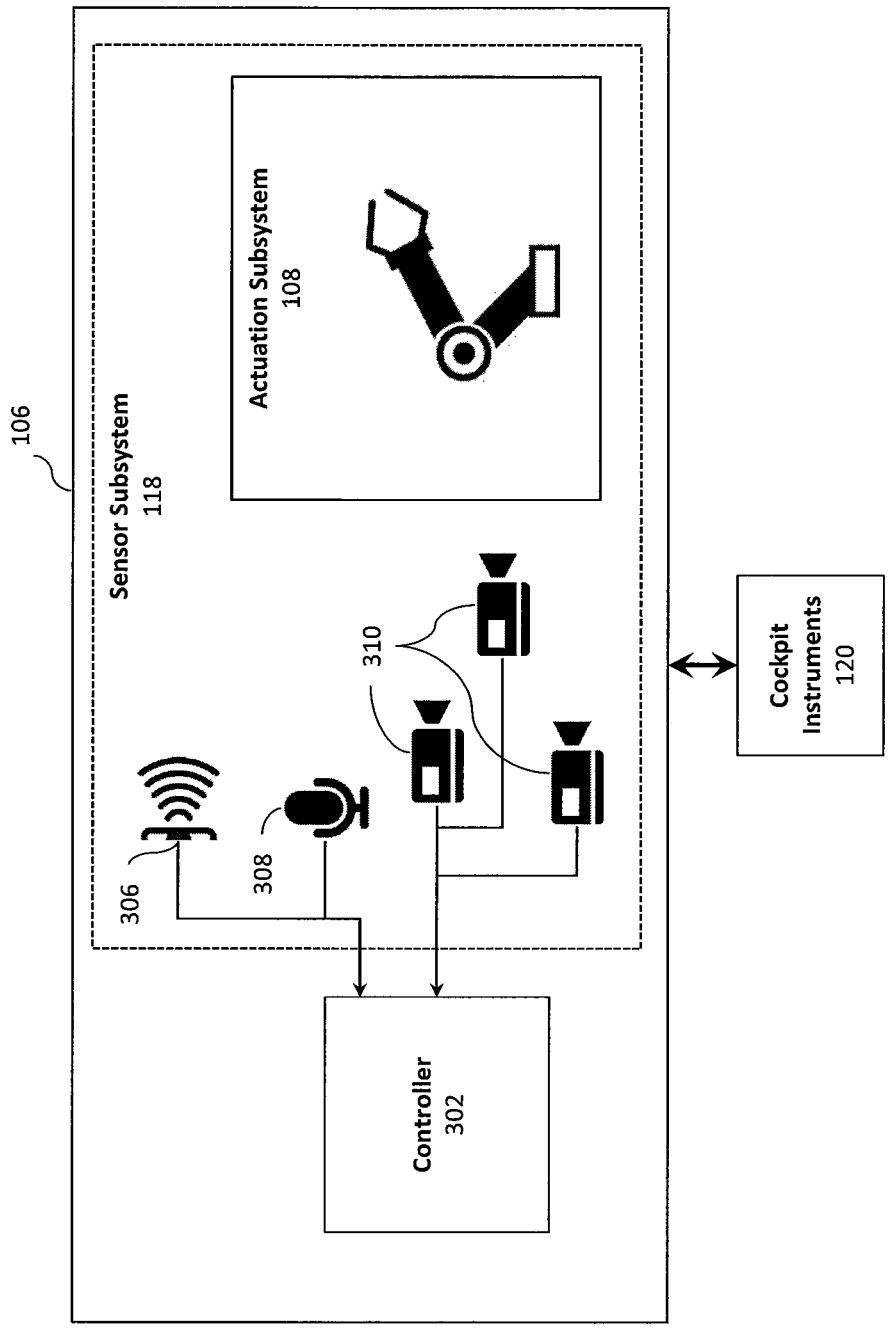
FIG. 3a illustrates a block diagram of an example perception subsystem.

As shown in FIG. 3a, the perception subsystem 106 may comprise a controller 302 and a sensor subsystem 118. The controller 302 may be, for example, a processor configured to feed vehicle state data to (and/or otherwise instruct) the core platform 102 based upon information received from a plurality of sensors and/or external components, such as the sensor subsystem 118, a GPS/INS system, and/or other input systems. The perception subsystem 106 may receive commands and/or configuration data from the core platform 102, while sending to the core platform 102 status and/or flight situation information (e.g., flight situation data) and/or images gathered by the perception subsystem 106.

In some examples, the perception subsystem 106 may interface and/or communicate directly with the cockpit instruments 120, such as through one or more wired electrical and/or wireless connections and/or protocols. In such an example, the perception subsystem 106 may collect, sense, measure, detect, determine, and/or otherwise perceive real-time vehicle and/or environment situation data directly from the cockpit instruments 120. In such an example, the controller 302 may, for example, interface directly with the cockpit instruments 120 and/or facilitate communication with the cockpit instruments 120.

Sensor Subsystem. Additionally, or alternatively, the perception subsystem 106 may employ the sensor subsystem 118 to collect, sense, measure, detect, determine, and/or otherwise perceive real-time vehicle and/or environment situation data from the cockpit instruments 120. The sensor subsystem 118 may include sensors such as, for example, image sensors, optical sensors, cameras 310, microphones 308 (used for the acoustic system), and/or other sensors 306 (e.g., temperature sensors, positional sensors, inertial sensors, accelerometers, gyroscopes, etc.). In examples where image/optical sensors and/or cameras are used, the perception subsystem 106 may include a graphical processing unit (GPU), such as, for example, an NVIDIA Tegra X1. In some examples, the GPU may be part of the controller 302.

The sensor subsystem 118 may utilize its sensors in combination with a vision system, an acoustic system, and/or identification algorithms to read and/or comprehend vehicle state information displayed by cockpit instruments 120, similar to how an operator may use their own senses. The sensors of the sensor subsystem 118 may be focused and/or trained on an instrument panel in the cockpit (e.g., the cockpit instruments 120). The sensors may be positioned with a line of sight with the instrument panel, but also placed to not be obstructive to the operator.

Example cockpit instruments 120 may include, for example, a fuel gauge, a temperature gauge, a wind gauge, an altimeter, a speedometer (and/or an airspeed indicator, a vertical speed indicator), an odometer, a pressure gauge, one or more compass systems (e.g., a magnetic compass), one or more gyroscopic systems (e.g., attitude indicator, heading indicator, turn indicator), one or more vehicle director systems, one or more navigational systems (e.g., global positioning system (GPS), inertial navigation system (INS), very-high frequency omnidirectional range (VOR), non-directional radio beacon (NDB)), an engine status indicator, a control surface status indicator, gear status indicator, light settings, radio settings, and/or other settings. The perception subsystem 106 and/or sensor subsystem 118 may be configured via the core platform 102 and/or one or more DTR configuration files, so as to be compatible with a cockpit layout of the vehicle and/or cockpit instruments 120 of the vehicle, which may range from basic analog instruments to highly integrated, glass cockpit avionics suites. The perception subsystem 106 may be configured to monitor vehicle agnostic and/or vehicle specific cockpit instruments 120.

Vision system. The perception subsystem 106 and/or sensor subsystem 118 may employ a monocular or stereo-vision system, possibly including motion capture markers and/or fiducial markers, to continuously monitor the status of the vehicle by reading what is displayed on the cockpit instruments 120. The vision system may be used to accurately monitor instruments (e.g., glass gauges, physical steam gauges, etc.) and/or switches, as well as their positions in a variety of lighting conditions and cockpit layouts and sizes. Using a stereovision system and/or markers also provides sensing to prevent collisions between any robotic components and the vehicle operator.

The one or more cameras 310 (e.g., lightweight machine vision cameras) of the sensor subsystem 118 may be trained on a cockpit instrument panel to maximize pixel density, glare robustness, and redundancy. The one or more cameras 310 may connect to the perception controller 302 via a wired and/or wired connection. The one or more cameras 310 may be installed with a line of sight with the instrument panel, but so as to be not obstructive to the vehicle operator. In certain aspects, by comparing information about a scene from two vantage points, 3D information can be extracted by examining the relative positions of objects in the two panels.

The vision system may be used to accurately monitor cockpit instruments 120 (e.g., glass gauges, physical steam gauges, etc.) and switches, as well as their positions in a variety of lighting conditions and cockpit layouts and sizes. Using a stereovision system and/or fiducial markers also provides sensing to prevent collisions between any robotic components and the operator. The vision system may employ a suite of high-definition, stereo cameras, and/or a LIDAR laser scanner. The vision system may be capable of recognizing data from all cockpit instruments 120 and determine the condition and/or position of switches knobs and gauges that display the status of vehicle specific systems (e.g., remaining fuel). In some examples, the vision system may be reconfigurable via the core platform 102 and/or DTR file(s) so to recognize cockpit instruments 120 and/or a cockpit layout of a particular type of vehicle. The vision system may also be configured to recognizing data of an instrument panel with enough resolution to detect minor changes that result from operator actions. Machine vision algorithms of the perception subsystem 106 may 'read' the cockpit instruments 120 (gauges, lights, wind correction angle panel, individual elements of a primary display and/or multi-function display in a glass cockpit) and/or mechanical items such as throttle levers, trim settings, switches, and/or breakers to provide a real-time cockpit state/status update to the core platform 102.

Figure 4B:
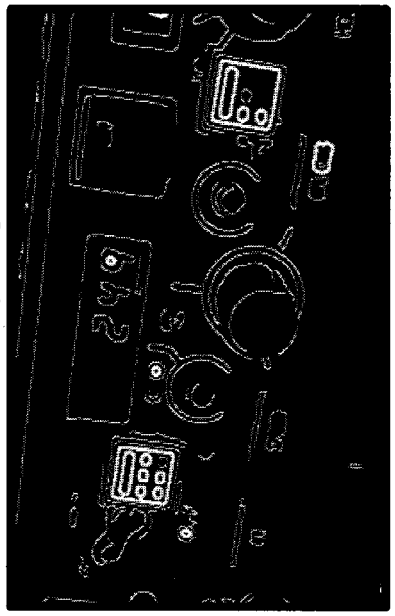
Figure 4A:
FIG. 4a illustrates an example raw image captured by an imaging system.
Figure 4C:
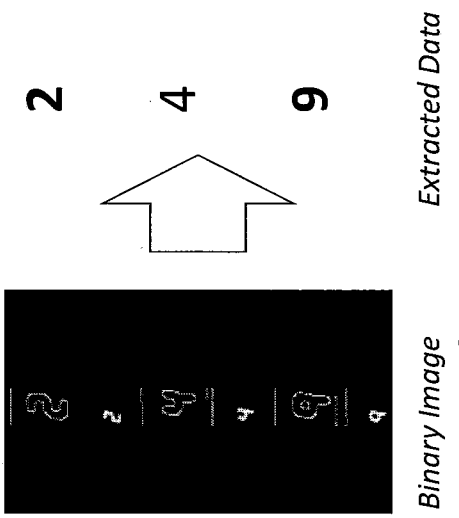
FIG. 4c illustrates an example of data extracted from the reformatted image of FIG. 4b.

In the example illustrated in FIGS. 4a through 4c, the camera captures an image of cockpit instruments 120 (FIG. 4a), and an edge-detection algorithm is performed on the image to generate the binary image (FIG. 4b). Such a process can be incremented throughout the identification and/or analysis routine. As shown in FIG. 4c, the system is capable to recognize information presented on the controls, transformed via the edge-detection algorithm. In the example of FIG. 4c, the extracted data (numerals 2, 4 and 9) captured from an LCD display on the control panel, are identified and analyzed by the system. For example, optical character recognition processes may be performed on the binary image or variation thereof. Accordingly, the information can be used to inform and control implementation of autonomous systems described herein. FIG. 4d illustrates an additional image of a set of cockpit instruments 120. As explained above, application of an edge-detection algorithm generates a virtual, parsable image (FIG. 4e), which serves as an interim step in vision system processing and analysis.

Actuation Subsystem. The sensor subsystem 118 may be fixed in a particular location, and/or coupled to a movable object, such as a robotic arm 110 of an actuation subsystem 108. In some examples, the actuation subsystem 108 may be part of the sensor subsystem 118 and used to maneuver the sensors about the cockpit, so as to better observe and/or interact with the various cockpit instruments 120. The sensor subsystem 118 of the perception subsystem 106 may also provide secondary information about the status and/or positioning of the actuation subsystem 108.

The actuation subsystem 108 may include, for example, a robotic arm 110 having one or more sensors of the sensor subsystem 118. The actuation subsystem 108 may, for example, execute actions commanded by the core platform 102, perception subsystem 106, and/or sensor subsystem 118, to monitor operation of the vehicle without interfering with the activities performed by the operator. The actuation subsystem 108 may receive actuation commands and/or configuration data from the core platform 102, perception subsystem 106, and/or sensor subsystem 118, while sending to the core platform 102 status and/or response information generated by the actuation subsystem 108.

As shown in FIG. 3b, the actuation subsystem 108 may include a robotic arm 110. The robotic arm 110 may include a frame 408 having an articulating arm 402 (e.g., a robotic appendage or "arm"). The actuator-controlled articulating arm 402 may be sized, shaped, and/or configured to occupy the space typically occupied by a passenger and/or co-pilot, or a portion (e.g., arms, legs, torso, etc.) of a passenger and/or co-pilot, thereby ensuring adequate access to the cockpit instruments 120 and/or portability.

To enable movement in multiple degrees of freedom ("DOF") movement, the articulating arm 402 may comprise a plurality of arm segments (whether linear, curved, or angled) joined using a plurality of hinged or pivotal joints 406. The articulating arm 402 may comprise an end-effector 404 at its distal end. The end-effector 404 may be coupled to the articulating arm 402 via a multiple-DOF connection. The base of the articulating arm 402 may be rotatable and slideably coupled to the frame 408 via a movable base. The articulating arm 402 can be equipped with an encoder (e.g., twin 18-bit encoders) for each of its degrees of freedom to ensure exact positioning of the articulating arm 402. Internal clutches may be provided at each hinged or pivotal joint 406 such that the articulating arm 402 can be overpowered by the operator if so desired, without damaging the articulating arm 402. In such a case, the vehicle monitoring system 100 may determine the position and/or location of the articulating arm 402 using the encoders.

The end-effector 404 may be, for example, a gripper configured to couple, and/or otherwise engage, for example, throttle levers, etc. The end-effector 404 may also provide force and/or pressure detection so as to allow the perception subsystem 106, sensor subsystem 118, and/or vehicle monitoring system 100 to estimate how a flight controls actuator is grasped and to adjust the motion to properly read and/or engage the cockpit instruments 120. Once the motion is executed, the same force and/or pressure detection may be used to determine if the desired switch configuration has been achieved. In certain aspects, the articulating arm 402 may be fitted with an electronic device (e.g., a tracking device, homing device, camera, pressure sensors, etc.) that enables it to find and/or hit a target. In certain aspects, the robotic arm 110 may be provided with sensors and/or imaging capabilities integrated therewith. In particular, the robotic arm 110 may be optimized for collecting and/or analyzing image data. In some examples, the robotic arm 110 may include a camera (e.g., camera 310 of sensor subsystem 118) at its end-effector 404 used for imaging a scene of the aircraft, such as cockpit instruments 120 and/or corresponding displays. The robotic arm 110 may also include a force-sensing finger to both enable closed-loop control of a desired contact force, as well as collect contact force data during operation of the robotic arm 110. In some examples, the robotic arm 110 may include multiple cameras, multiple force-sensing fingers, and/or multiple end-effectors 404, integrated into the robotic arm 110 using a sufficient number of joints 406 and/or arm segments 402.

Therefore, the robotic arm 110 may be integrated with the sensor subsystem 118 (e.g., using the vision system described in connection with the sensor subsystem 118 and/or perception subsystem 106), and one or more controllers to implement a variety of complex interface operations. For example, the sensor subsystem 118 may provide information to a controller (e.g., core platform 102) to manipulate a cockpit instrument 120 (e.g., a switch, a dial, a knob, etc.), ensure that the instrument is correctly identified, as well as make determinations as to the condition of the instrument before, during, and after the operation. For instance, a switch can be located in a particular area of the cockpit, the distance and location being identified by the perception subsystem 106. Upon receiving a command to operate the switch, the controller may determine the optimal way to move the end-effector 404 to the switch (e.g., trajectory of the robotic arm, distance from current position to the switch). The controller may further determine one or more parameters of the interaction (e.g., an expected change in condition and/or position of the switch, an amount of force required to activate the switch, etc.) and monitor information from the sensors corresponding to those parameters.

The camera 310 (and/or other sensors of the sensor subsystem 118) mounted to the robotic arm 110 may allow for the sensor subsystem 118 to obtain a variety of views from multiple perspectives within the cockpit. At one end of the robotic arm 110, a robotic appendage, such as the end-effector 404, may integrate imaging and/or force sensors. Therefore, in a cockpit environment, instruments can be oriented vertically, horizontally, or at various angles, to conform to the reach and position of a human operator. The camera 310 mounted to the robotic arm 110 may view surfaces and instruments at various locations and angles within the cockpit. In this manner, the robotic arm 110 can be moved about the cockpit to view instruments that may be blocked from a static view, as well as avoiding obscuring the view of the operator during vehicle operation. Thus, the flexibility of the robotic arm 110 described herein is a departure from statically-mounted cameras found in other systems, with multiple advantages as described herein. While illustrated as separate components, in certain aspects, the actuation subsystem 108, sensor subsystem 118, and/or the perception subsystem 106 may share components, such as the perception controller 302 and/or cameras 310.

In operation, information from the camera(s) 310 (and/or other sensors of the sensor subsystem 118) mounted to the robotic arm(s) 110 may be employed to build and/or verify two- and/or three-dimensional models of the cockpit and/or associated instrumentation. Integrating image sensors may greatly enhance flexibility to observe and/or interact with the cockpit instrument 120 interfaces (e.g., buttons, switches, knobs, screen interfaces, etc.) and/or understanding different conditions of the instruments. In some examples, the camera(s) 310 may send data to a controller to analyze and/or manipulate the images to create a standardized view. The standardized view may be in a format that is easily readable by one or more systems. For example, a raw camera 310 image of a device and/or control (e.g., as shown in FIGS. 4a and 4d) can be reformatted to binary images (e.g., as shown in FIGS. 4b and 4e) such that elements of the image are recognizable as an instrument panel containing one or more physical and/or virtual controls (e.g., buttons, dials, switches, etc.). Each of the one or more controls can correspond to one or more displays, such as a numerical readout.

Advantageously, the process of reformatting the image may allow for the system to recognize particular controls and/or displays regardless of relative orientation. In other words, the image may be taken from any angle and/or distance from the cockpit instruments 120; yet the controller may be capable of identifying and/or manipulating imaged elements to recognize, and thus compare, the instruments with a catalogue of images of known instruments.

Knowledge acquisition subsystem 114. The knowledge acquisition subsystem 114 may gather and/or generate knowledge necessary to enable the vehicle monitoring system 100 to determine vehicle specific information. This may include knowledge of vehicle performance, characteristics, capabilities, limitations, layout, instrumentation, checklists, missions, and/or procedures (including emergency procedures), as well as criteria that define contingencies and/or corrective action in the vehicle. The knowledge may include, for example, the contents of certain vehicle missions, operations, checklists, and/or procedures as well as the flow of tasks both within and between missions, operations, checklists, and/or procedures. The knowledge may be obtained from a combination of vehicle literature encoded into data readable by the knowledge acquisition subsystem 114 (e.g., from manuals, briefings, pilot operating handbook, vehicle operating handbook). The knowledge may additionally, or alternatively, be obtained from data acquired during vehicle operation (e.g., via the perception subsystem 106). The knowledge acquisition subsystem 114 may include a database subsystem 122 and a context awareness subsystem 124. The knowledge acquisition subsystem 114 may receive operational commands from the core platform 102, while sending to the core platform 102 configuration data, status, response information, and/or knowledge gathered and/or generated by the knowledge acquisition subsystem 114.

Database Subsystem. Knowledge gathered and/or generated by the vehicle monitoring system 100 may be stored in the database subsystem 122, whether positioned on the vehicle or remotely situated, which may be remotely accessed. The database subsystem 122 may support on-line and/or off-line machine-learning and/or trend analysis. During operations, the database subsystem 122 may be dynamically updated with real-time data gathered by, inter alia, the perception subsystem 106, the user interface 126, as well as the internal state sensing of the vehicle monitoring system 100. After operation, data from the database subsystem 122 may be downloaded to one or more central repositories, so that, for example, trend and/or pattern analysis may be performed. The data in the database subsystem 122 may be timestamped, organized according to the time period recorded, and/or otherwise associated with a given time period.

In some examples, some or all of the data of the database subsystem 122 may be encoded into and/or decoded from a digital file. In some examples, data population of the database subsystem 122 may be accomplished using the Extensible Markup Language ("XML"), such as in examples where the digital file may use an .xml file format. More specifically, an XML data structure may be employed that comprises a set of fields and data trees that, when populated, allow the core platform 102 (and/or the vehicle monitoring system 100 and its subsystems) to be configured for operation with a particular vehicle. In certain aspects, the vehicle monitoring system 100 may employ natural language interpretation of documents (e.g., flight documents) and/or a software tool that enables a human to enter the data efficiently and accurately.

Figure 5:
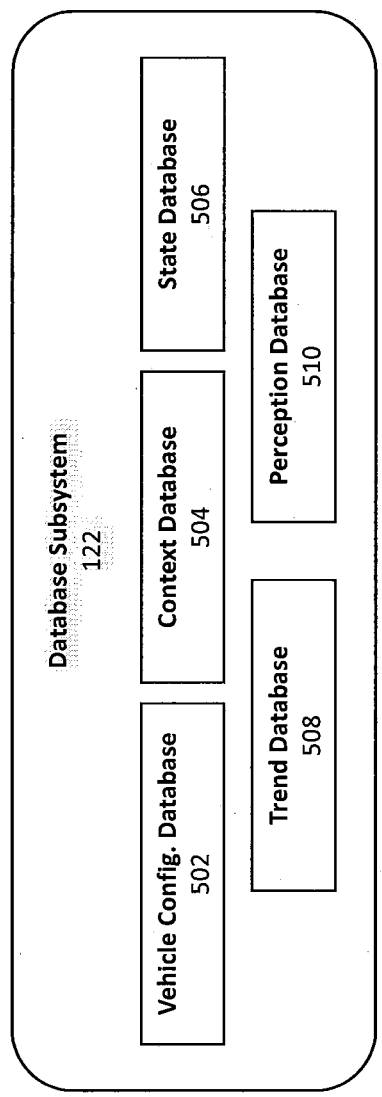
FIG. 5 illustrates a block diagram of an example database subsystem.

The database subsystem 122 may include multiple individual databases and/or other data retention structures. For example, as shown in FIG. 5, the database subsystem 122 may include a state database 506, a context database 504, a perception database 510 a trend database 508, and/or a vehicle configuration database 502. While these databases are shown as being separate and distinct, in some examples two or more of the databases may be combined into a single database. In some examples, one or more of the illustrated databases may be split into multiple databases.

Vehicle configuration database. The vehicle configuration database 502 may store information related to the vehicle's systems, its configuration, and/or the procedures necessary to maintain safe operation, as well as all other knowledge and/or expertise a certified operator of that vehicle would be expected to have. The vehicle configuration database 502 may be populated by the knowledge acquisition subsystem 114 and/or other subsystems having necessary information about the vehicle currently being operated (e.g., flight control model, operational procedures, vehicle systems, etc.). In some examples, the vehicle configuration database 502 may be populated by external devices in communication with the vehicle monitoring system 100 through the user interface 126. For example, a DTR file may be loaded into the vehicle monitoring system 100 through the user interface 126. Information from the vehicle configuration database 502 may be used to populate the DTR file (or vice versa—depending on a desired configuration).

The vehicle configuration database 502 may be populated and/or adjusted to a specific vehicle during a knowledge acquisition phase (e.g., during initial setup) such that it contains all the information necessary to operate the vehicle. For example, when transitioning to a new vehicle, the knowledge acquisition subsystem 114 may perform predefined activities in order to determine the layout (e.g., of the controllers/read outs, such as the cockpit instruments), performance parameters, and other characteristics of the vehicle. The predefined activities may include, for example: (1) generation of a vehicle system model, which may inform the vehicle monitoring system 100 about which systems are onboard and how they are configured, actuation limits, etc.; (2) procedure codification, which may inform the vehicle monitoring system 100 how the vehicle is operated in normal and/or non-normal situations, further including the codification of checklists; (3) a vehicle dynamics model (e.g., aerodynamics, fluid dynamics, etc.), which may informs the vehicle monitoring system 100 how the vehicle is operated and what performance to expect for which vehicle configurations; and/or (4) information about mission operations. In some examples, the knowledge acquisition subsystem 114 may perform these activities with the assistance of the perception subsystem 106, and/or one or more other subsystems of the vehicle monitoring system 100.

The core platform 102 may use the data in the vehicle configuration database 502 to configure the various subsystems of the vehicle monitoring system 100. The core platform 102 may combine the information of the vehicle configuration database 502 with data from a set of internal sensors as well as the perception subsystem 106 and/or the context awareness subsystem 124 to generate a highly accurate estimate of the vehicle state and/or status, and/or identify deviation from expected behavior, state, and/or status. Once the vehicle configuration database 502 for a given vehicle is populated with data, the populated data may be retained in a DTR file and used for all other vehicles of the same make and/or model for which vehicle monitoring system 100 is available. The populated data and/or DTR file may be further refined as additional data is generated and/or collected by the vehicle monitoring system 100.

Context Database. The context database 504 may store information pertaining to vehicle missions, checklists, and/or procedures. The information may be vehicle specific and/or vehicle agnostic. For example, machine learning techniques may be employed to determine the type of vehicle and/or other aspects specific to the vehicle based on historic data of the vehicle. The missions, checklists, and/or procedures may be loaded into the context database 504 at initialization and/or setup of the vehicle monitoring system 100. In some examples, the missions, checklists, and/or procedures may be loaded using one or more DTR files; though a single DTT may be used for each kind of mission. In some examples, the context database 504 may include pointers, links, and/or references to other databases in the database subsystem 122, so as to correlate context data with other related data (e.g., the state(s) of the vehicle before/after the recorded context, the perception(s) of the vehicle before, during, and/or after the recorded context, any trends the recorded context may be part of, etc.).

Procedures may include, for example, takeoff/landing procedure(s), cruising procedure(s), ascending procedure(s), descending procedure(s), refueling procedure(s), venting procedure(s), taxiing procedure(s), parking procedure(s), mission specific procedure(s), holding pattern procedure(s), passing procedure(s), entry/exit procedure(s), etc. Checklists associated with each procedure, and/or with general operation of the vehicle, may also be stored in the context database 504.

In certain aspects, a set of vehicle agnostic procedures may be gathered, generated, and/or retained. For example, procedures like landing gear retraction, engine out procedures on multi-engine aircraft, and stall recovery are similar across many types of aerial vehicles and will need only minimal modification for a particular airframe. Moreover, basic airframe limitations (such as never exceed speeds)

need only be entered as specific numbers and can be entered from flight manuals in a nominal period of time.

State Database. The state database 506 may retain information pertaining to the state of the vehicle. The state information may be gathered and/or generated by the state monitoring subsystem 104. The state information may be used by the trend monitoring subsystem 116 to identify trends with respect to the operation of the vehicle. In some examples, the state database 506 may include pointers, links, and/or references to other databases in the database subsystem 122, so as to correlate state data with other related data (e.g., the state(s) of the vehicle immediately before/after, the context(s) of the vehicle during, before, and/or after the state, the perception(s) of the vehicle before, during, and/or after the state, any trends the vehicle state may be part of, etc.).

Perception Database. The perception database 510 may retain data recorded by the perception subsystem 106 over time, so that the data is retained during operation of the vehicle monitoring system 100. The data recorded and/or retained in the perception database 510 may be used by the various subsystems help determine context, state, trends, and/or other information.

Trend Database. The trend database 508 may retain data pertaining to previously identified trends. Some or all of the previously identified trends may be loaded at setup/initialization of the vehicle monitoring system 100. Some or all of the trends identified during operation of the vehicle monitoring system 100 may be saved in the trend database 508 during operation of the vehicle monitoring subsystem 100. In some examples, the trend database 508 may include pointers, links, and/or references to other databases in the database subsystem 122, so as to correlate trend data with other related data (e.g., the state(s) of the vehicle during the trend, the context(s) of the vehicle during the trend, the perception(s) of the vehicle over the trend, etc.).

Context Awareness Subsystem. The context awareness subsystem 124 may identify and/or maintain awareness of a mission, checklist, and/or procedural "context" of the vehicle at any given time. Context may be vehicle specific and/or vehicle agnostic. In some examples, context and state may be interdependent, such that a determination of current and/or predicted vehicle state by the state monitoring subsystem 104 may at least partly depend and/or be based upon a current, previous, and/or predicted future vehicle context identified by the context awareness subsystem 124, and/or vice versa. In some examples, context or state may be selected as taking priority, such that one or the other (context or state) is determined first. In some examples, the priority may be automatically set depending on the particular vehicle type, the particular operator, the current mission, and/or some other consideration. In some examples, the priority may be set manually by an operator through the user interface 126.

The context awareness subsystem 124 may maintain awareness of context using stored missions, checklists, and/or procedures. The missions, checklists, and/or procedures may be stored, for example, in the context database 504 of the database subsystem 122. The missions, checklists, and/or procedures may be loaded into the context database 504 at initialization and/or setup of the vehicle monitoring system 100. In some examples, some or all of the missions, checklists, and/or procedures may be associated with the class, category, type, make, and/or model of vehicle being monitored by the vehicle monitoring system 100. In some examples, some or all of the missions, checklists, and/or procedures may be vehicle agnostic. In some examples, the missions, checklists, and/or procedures may be loaded using one or more DTR files.

The context awareness subsystem 124 may identify a current vehicle context as corresponding to one or more missions, checklists, and/or procedures at any given moment. The identification may be based on the current, previous, expected, and/or predicted state of the vehicle. The identification of the current context may further based on the contents of the context database 504, current data from the perception subsystem 106, prior data from the perception subsystem 106 (stored in the database subsystem 122, for example), information from an operator entered via the user interface 126, and/or other information sources. In some examples, a transition from one state to another may inform and/or trigger a current vehicle context determination. The context awareness subsystem 124 may store prior vehicle contexts in the context database 504.

Figure 6:
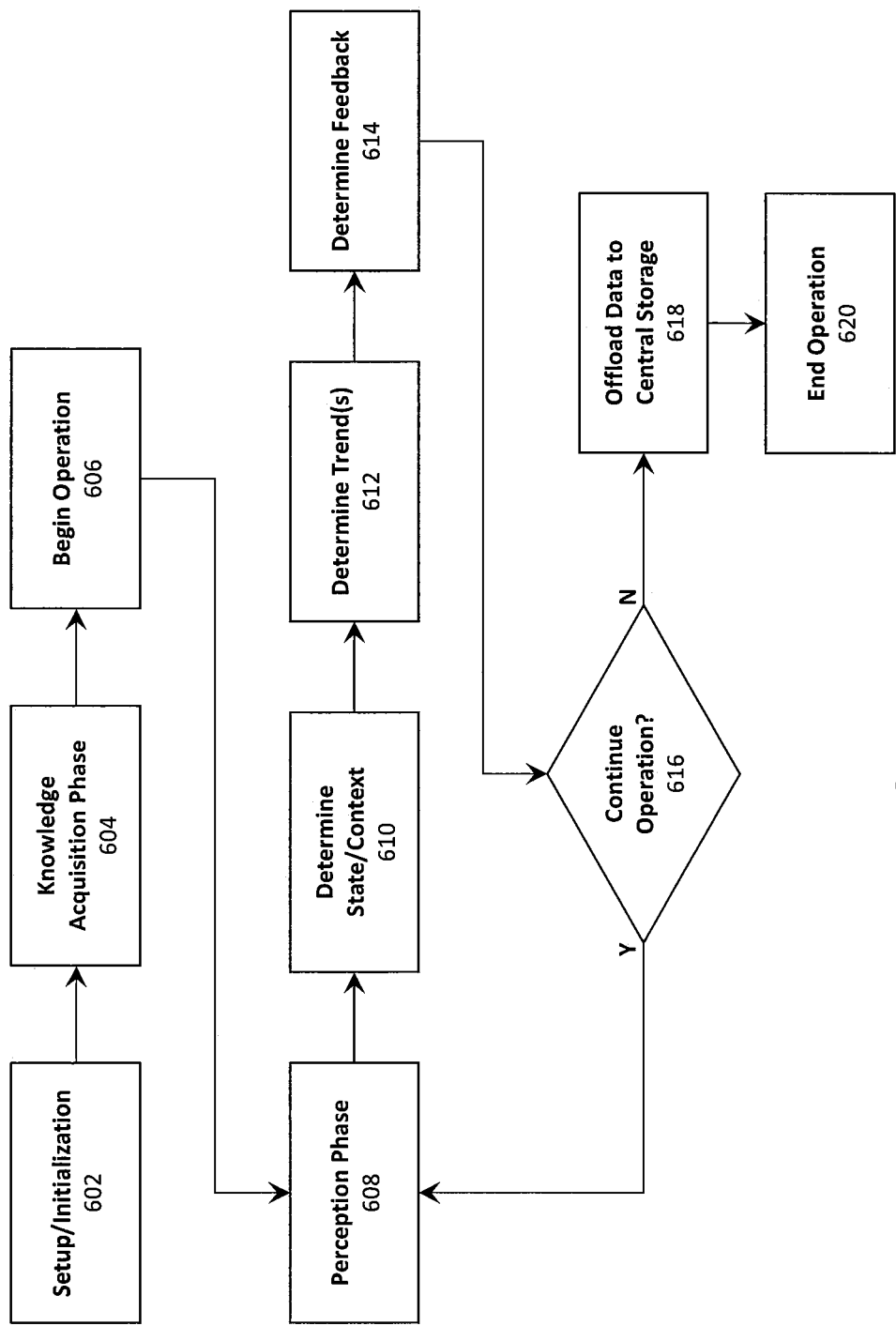
FIG. 6 illustrates an example operation of the vehicle monitoring system.

Operation. FIG. 6 illustrates an example operation of the vehicle monitoring system 100. At step 602, the vehicle operating system 100 is setup and/or initialized. This may take place before, after, and/or during ignition of the vehicle. During setup, the components of the vehicle monitoring system 100 may be installed in the vehicle. The perception subsystem 106 may be hardwired and/or otherwise interfaced with the cockpit instruments 120 of the vehicle. In examples where cameras and/or other sensors are used, these devices may be appropriately setup to collect, measure, sense, and/or data from the cockpit instruments 120, while minimizing any obstruction to the operator(s). In a land vehicle (e.g., car, truck, ambulance, etc.) this may mean appropriately positioning the cameras and/or sensors in a passenger seat, backseat, dashboard area, center console, or some other appropriate position. For an aerial vehicle (e.g., airplane, helicopter, etc.), this may mean positioning in a pilot cabin, passenger seat, backseat, dashboard area, console area, or some other appropriate position. For an aquatic vehicle (ship, submarine, etc.), this may also mean something similar. In some examples, the vehicle monitoring system 100 may be installed in a vehicle simulator (e.g., to evaluate training simulations and/or develop initial data for trend analysis).

A knowledge acquisition phase occurs at step 604, which generally refers to a process where information about the vehicle is gathered from various sources (e.g., SME, manuals, etc.) and is used to populate the vehicle configuration database to ultimately generate the DTR file. Depending on the vehicle, the knowledge acquisition phase often happens before anything is installed in the vehicle and can take from a few hours to a month to complete.

During the knowledge acquisition phase, threshold conditions may be established for feedback subsystem comparison. These conditions may frequently be discrete, such as an engine over-speed or the exceedance of an airspeed limit. Additionally, vehicle configuration data may be uploaded into the vehicle configuration database 502 and/or other databases of the database subsystem 122. This information may include, for example vehicle dynamics data, operational limitations, missions, checklists, procedures, vehicle systems, instrument layouts, as well as other related data. The vehicle configuration data may be uploaded using one or more digital files (e.g., DTR file(s)). In one example, the knowledge acquisition phase may 1) collect knowledge about the vehicle, 2) build database and initial DTR while configuring the perception system, 3) debug DTR in simulation while installing perception system, 4) install one or more DTR (e.g., for one or more different missions), and 5) continue with setup and initialization.

At step 606, vehicle operation begins. This step may be automatically triggered after the knowledge acquisition phase, or manually triggered by an operator. Thereafter the vehicle monitoring system 100 enters a recurring loop in steps 608-614, until operation is discontinued at step 616. Discontinued operation may be automatically triggered by some event, trend, state transition, and/or context, or may be manually triggered by an operator.

During operation, at step 608, the perception subsystem 106 may monitor the instruments and/or controls in the vehicle cockpit (and/or a realistic simulator) as an operator pilots the vehicle. Observing the operator's actions may allow the vehicle monitoring system 100 to learn directly from the operator and implement trend analysis for that particular operator. This process may benefit from the fact that vehicle operations are sometimes highly structured in what is to be done in a given situation—machine learning then enables the codification of how something is to be executed, for example, identifying operational trends putting the vehicle at risk.

At step 610 the current vehicle state may be determined using the data from the perception subsystem 106, as well as other data (e.g., past and/or present states/contexts/trends). One or more predicted future states may also be determined. The vehicle context may also be determined using data from the perception subsystem 106 in conjunction with other data (e.g., past and/or present contexts/states/trends, predicted future states). The vehicle state(s) and/or context(s) may be stored in the database subsystem 122.

At step 612, trend analysis may be performed to identify one or more trends. The trends may be vehicle trends and/or operator trends. At step 614, appropriate feedback may be determined based on the identified state(s), context(s), and/or trend(s), in comparison with known and/or expected state(s), context(s), and/or trend(s). Feedback may be presented to the operator through the user interface 126.

Operation may continue or be discontinued at step 616. In some examples, operation may continue as a default unless some other input is received or some discontinuation action is automatically triggered due. Discontinued operation may be automatically triggered by some event, trend, state transition, and/or context, or may be manually triggered by an operator. In some examples the opposite may be true, and operation may discontinue as a default, requiring some automatic and/or manual input in order to continue operation.

Once operation is discontinued, the vehicle monitoring system 100 may offload its accumulated data (e.g., in the database subsystem 122) to a central repository at step 618. In some examples, the central repository may retain data from a fleet of vehicles and/or vehicle monitoring systems. In other examples, the central repository may only retain data from a single vehicle and/or vehicle monitoring system. The central repository may be used to assist in offline trend analysis and/or recognition for future vehicle monitoring system 100 operation. At step 620, operation of the vehicle monitoring system 100 is ended. In an example where the vehicle monitoring system 100 doesn't have access to a network, the vehicle monitoring system 100 may be configured with local drives that are removable to upload to the central repository.

FIGS. 7a and 7b illustrate an example procedure that may be used in the vehicle monitoring system. The example procedure is a procedure for an aerial vehicle. The procedure comprises a checklist of several tasks. Each lettered circle in the figure corresponds to a task in a checklist. The type of circle corresponds to the type of vehicle monitoring operation. For some tasks, no feedback (i.e., display) or other operation is performed. For other tasks, the system may display feedback with respect to the task, such as one or more indicators that the task is pending, incomplete, and/or complete. For some tasks, the system may require the operator respond to the feedback with some input to the user interface 126 confirming that the task has been completed. For some tasks, the perception subsystem 106 may independently confirm that the task has been completed through its reading of the cockpit instruments 120 and/or other vehicle instruments. The system may further display negative feedback (e.g., warnings, alerts, etc.) if the operator attempts to proceed with one or more tasks of the procedure before one or more predecessor tasks have been completed.

Figure 8:
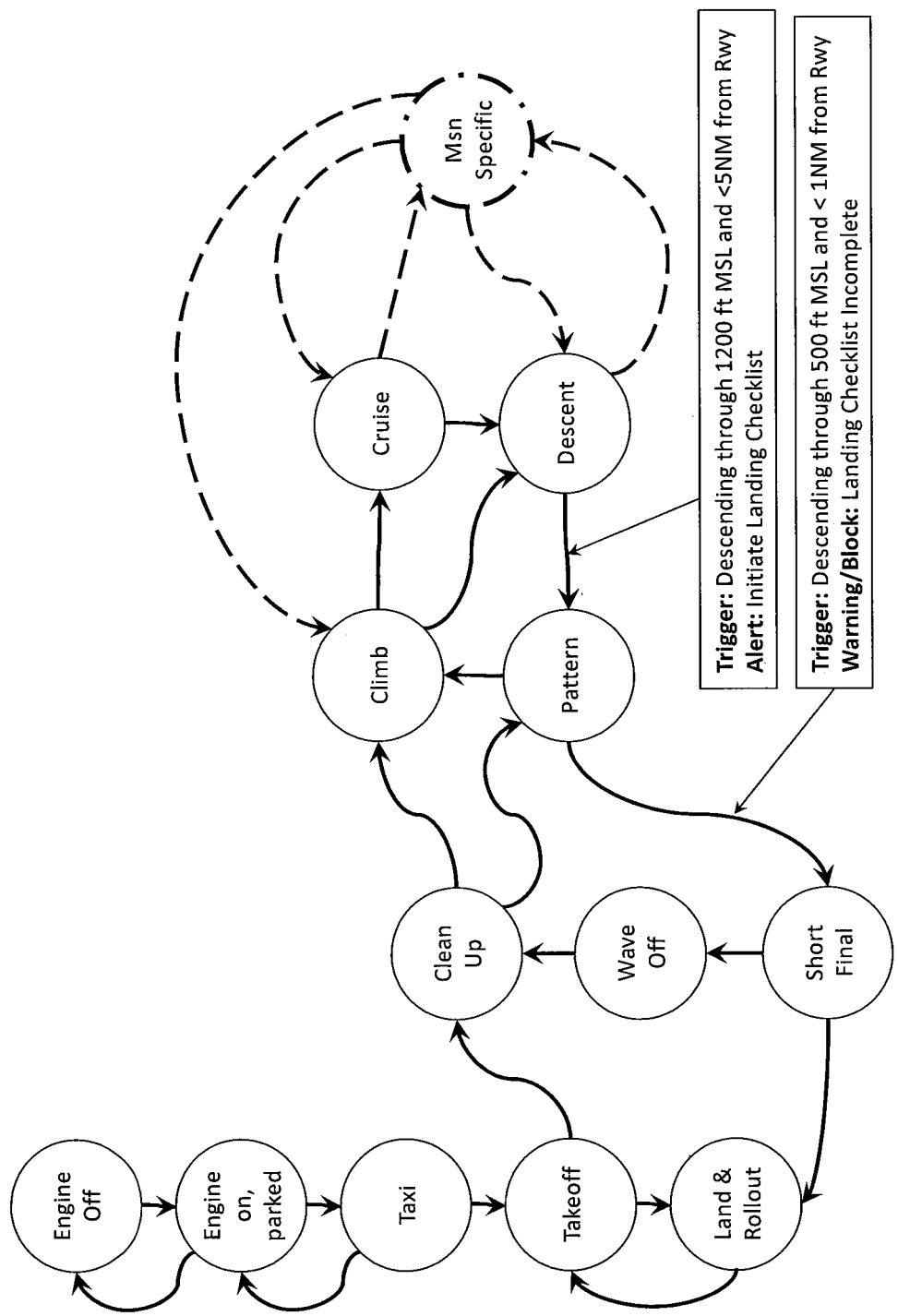
FIG. 8 shows an example state diagram illustrating an example operation of the vehicle monitoring system.

FIG. 8 illustrates an example state diagram that may be used in the vehicle monitoring system 100. The state diagram corresponds to states for an aerial vehicle. The diagram illustrates various states an aerial vehicle may take during operation. Those states and state transitions having dashed lines correspond to a mission specific state and/or transitions to/from the mission specific state. The figure illustrates how data acquired through the perception subsystem 106 during state transitions may trigger certain procedures, checklists, and/or feedback. More specifically, the figure illustrates a trigger during transition from a descent state to a holding pattern state. When the perception subsystem 106 detects an altitude of approximately 1200 feet above mean sea level (MSL) and a distance of less than five nautical miles (NM) from a runway, the system may infer a context of a landing procedure. This inference may be further informed by knowledge of a prior vehicle state significantly above 1200 feet MSL and significantly farther than five NM from a known runway. The system may further determine that the tasks of a landing checklist have yet to be completed, and provide appropriate feedback to the operator through the user interface 126. To the extent the operator continues, and the system detects an altitude of approximately 500 ft. above MSL, and a distance of less than one NM from the runway, the system may provide more urgent and/or expressive feedback. In some examples, the system may be permitted to interface with the vehicle to prevent the operator from proceeding further along (e.g., block further descent), until the appropriate task(s) of the checklist(s) procedure(s) are completed.

It can be appreciated that aspects of the present disclosure may be implemented by hardware, software and/or a combination thereof. The software may be stored in a non-transitory machine-readable (e.g., computer-readable) storage medium, for example, an erasable or re-writable Read Only Memory (ROM), a memory, for example, a Random Access Memory (RAM, a memory chip, a memory device, or a memory Integrated Circuit (IC), or an optically or magnetically recordable non-transitory machine-readable, e.g., computer-readable, storage medium, e.g., a Compact Disk (CD), a Digital Versatile Disk (DVD), a magnetic disk, or a magnetic tape.

While the present method and/or system has been described with reference to certain implementations, it will be understood by those skilled in the art that various changes may be made and equivalents may be substituted without departing from the scope of the present method and/or system. In addition, many modifications may be made to adapt a particular situation or material to the teachings of the present disclosure without departing from its scope. For example, systems, blocks, and/or other components of disclosed examples may be combined, divided, re-arranged, and/or otherwise modified. Therefore, the present method and/or system are not limited to the particular implementations disclosed. Instead, the present method and/or system will include all implementations falling within the scope of the appended claims, both literally and under the doctrine of equivalents.

What is claimed is:

1. An adaptable vehicle monitoring system for providing operator feedback to operate a vehicle, comprising:
    a context awareness subsystem configured to determine a current vehicle context that reflects an operational mode of the vehicle;
    a state monitoring subsystem configured to derive a current vehicle state based at least in part on current vehicle state data,
        wherein the state monitoring subsystem is operatively coupled with a knowledge acquisition subsystem that is configured to correlate the current vehicle state data with the current vehicle context as a function of at least one parameter of the vehicle, and
        wherein the state monitoring subsystem is configured to analyze, via one or more processors, the current vehicle state data and the current vehicle context using one or more machine-learning techniques to identify one or more trends;
    a feedback subsystem operatively coupled with the state monitoring subsystem,
        wherein the feedback subsystem is configured to prepare operator feedback based at least in part on a comparison between the current vehicle state and an expected vehicle state, and
        wherein the expected vehicle state is derived based at least in part on one or more stored vehicle states and the one or more trends; and
    a user interface configured to provide the prepared operator feedback to the operator.

2. The system of claim 1, wherein the state monitoring subsystem is further configured to analyze stored vehicle state data and stored vehicle contexts from similar types of vehicles to identify the one or more trends.

3. The system of claim 1, further comprising a perception subsystem having a plurality of cameras configured to acquire current vehicle state information visually from instruments located in a vehicle.

4. The system of claim 3, wherein the instruments comprise one or more of a fuel gauge, a temperature gauge, a wind gauge, an odometer, a pressure gauge, an altimeter, a speedometer, an airspeed indicator, a vertical speed indicator, a compass, a gyroscope, an attitude indicator, a heading indicator, a turn indicator, or a navigational system.

5. The system of claim 1, further comprising a database subsystem that is operatively coupled with the state monitoring subsystem and is configured to support off-line analysis by the state monitoring subsystem.

6. The system of claim 1, wherein the operator feedback comprises a warning if a deviation between the expected vehicle state and the current vehicle state exceeds a predetermined threshold.

7. The system of claim 1, wherein the current vehicle context is determined based at least in part on one or more of a vehicle type, a vehicle operating handbook, standard vehicle operating procedures, operator input, mission parameters, vehicle destination, current vehicle state data, stored vehicle state data, vehicle position, external environment, and stored trends.

8. The system of claim 1, wherein the vehicle monitoring system is compatible with a different type of vehicle and can be adapted to the different type of vehicle based at least in part on encoded information in a digital file.

9. The system of claim 8, wherein the encoded information comprises one or more of a vehicle type, vehicle layout, vehicle instruments, and vehicle capabilities.

10. The system of claim 9, wherein the stored vehicle state data, stored vehicle contexts, and stored vehicle states correspond to the vehicle type encoded in the digital file.

11. A method for providing operator feedback to operate a vehicle, the method comprising the steps of:
    determining a current vehicle context, wherein the current vehicle context reflects an operational mode of the vehicle;
    deriving a current vehicle state based at least in part on current vehicle state data;
    correlating the vehicle state data with the current vehicle context as a function of at least one parameter of the vehicle;
    analyzing the current vehicle state data and the current vehicle context using one or more machine-learning techniques to identify one or more trends;
    preparing operator feedback based at least in part on a comparison between the current vehicle state and an expected vehicle state, wherein the expected vehicle state is derived based at least in part on one or more stored vehicle states and the one or more trends; and
    generating the prepared operator feedback via a user interface.

12. The method of claim 11, wherein the one or more trends are identified using stored vehicle state data, stored vehicle contexts, and stored vehicle states from similar types of vehicles.

13. The method of claim 12, wherein the current vehicle state data is acquired using a plurality of cameras configured to collect data from instruments in a vehicle cockpit.

14. The method of claim 12, wherein the current vehicle state is determined from at least one of a fuel gauge, a temperature gauge, a wind gauge, an odometer, a pressure gauge, an altimeter, a speedometer, an airspeed indicator, a vertical speed indicator, a compass, a gyroscope, an attitude indicator, a heading indicator, a turn indicator, or a navigational system.

15. The method of claim 12, wherein the operator feedback comprises a warning if a deviation between the expected vehicle state and the current vehicle state exceeds a predetermined threshold.

16. The method of claim 12, the method further comprising a step of adapting to a different type of vehicle based at least in part on encoded information in a digital file.

17. The method of claim 16, wherein the encoded information comprises one or more of a vehicle type, vehicle layout, vehicle instruments, and vehicle capabilities.

18. The method of claim 12, further comprising a step of accessing a database subsystem configured to support off-line analysis.

* * * * *